United States Patent
Umeda

(10) Patent No.: US 7,826,659 B2
(45) Date of Patent: Nov. 2, 2010

(54) IMAGE PROCESSING APPARATUS AND METHOD, COMPUTER PROGRAM, AND STORAGE MEDIUM DIVIDING AN INPUT IMAGE INTO BAND IMAGES

(75) Inventor: Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1196 days.

(21) Appl. No.: 11/440,401

(22) Filed: May 25, 2006

(65) Prior Publication Data

US 2006/0280363 A1 Dec. 14, 2006

(30) Foreign Application Priority Data

Jun. 14, 2005 (JP) ............... 2005-174253

(51) Int. Cl.
*G06K 9/00* (2006.01)
*G06K 9/46* (2006.01)
*G06K 9/34* (2006.01)

(52) U.S. Cl. ...................... 382/167; 382/190

(58) Field of Classification Search ................ 382/103, 382/117, 162, 164, 167, 168, 172, 173, 190, 382/275; 358/1.9, 1.18, 515, 518, 523, 525, 358/530; 345/589, 600–604
See application file for complete search history.

(56) References Cited

U.S. PATENT DOCUMENTS

| 5,659,407 | A  | * | 8/1997  | Andresen et al. ............ 358/530 |
| 6,292,574 | B1 | * | 9/2001  | Schildkraut et al. ......... 382/117 |
| 6,888,963 | B2 | * | 5/2005  | Nichogi ...................... 382/167 |
| 6,983,070 | B2 | * | 1/2006  | Yamada ....................... 382/167 |
| 7,035,461 | B2 | * | 4/2006  | Luo et al. .................... 382/167 |
| 7,330,209 | B2 | * | 2/2008  | Osamato ...................... 348/273 |
| 2002/0114533 | A1 | * | 8/2002 | Smith et al. .................. 382/275 |
| 2002/0196467 | A1 | * | 12/2002 | Delhoune et al. ........... 358/1.18 |
| 2003/0198384 | A1 | * | 10/2003 | Vrhel .......................... 382/190 |
| 2004/0096103 | A1 | * | 5/2004 | Gallagher et al. ........... 382/167 |
| 2005/0169521 | A1 | * | 8/2005 | Hel-Or ........................ 382/167 |
| 2005/0259281 | A1 | * | 11/2005 | Boust .......................... 358/1.9 |
| 2006/0104507 | A1 | * | 5/2006 | John ........................... 382/167 |
| 2006/0280361 | A1 | * | 12/2006 | Umeda ........................ 382/167 |
| 2006/0280362 | A1 | * | 12/2006 | Umeda ........................ 382/167 |
| 2006/0280363 | A1 | * | 12/2006 | Umeda ........................ 382/167 |
| 2007/0140589 | A1 |   | 6/2007 | Umeda |

FOREIGN PATENT DOCUMENTS

| JP | 11-136498 | 5/1999 |
| JP | 11-149559 | 6/1999 |
| JP | 11-284874 | 10/1999 |
| JP | 2000-125320 | 4/2000 |

* cited by examiner

*Primary Examiner*—Amir Alavi
(74) *Attorney, Agent, or Firm*—Fitzpatrick, Cella, Harper & Scinto

(57) ABSTRACT

An embedded system of a digital camera or printer has limited available memory resources. Under such environment, devices are required to detect a red-eye region from a high-resolution image. To solve this problem, an input image is divided into band images each including a predetermined number of lines, so that an overlap area exists between neighboring band images, and candidate pixels which form an image region exhibiting poor color tone are extracted for each band image. The band image which is to undergo characteristic amount determination is determined based on the position of the candidate region which includes the candidate pixels in the overlap area.

22 Claims, 42 Drawing Sheets

F I G. 10

| DIRECTION | 1 | 2 | 3 | 4 | 5 | 6 | 7 | 8 |
|---|---|---|---|---|---|---|---|---|
| FREQUENCY OF OCCURRENCE | 1 | 1 | 2 | 1 | 0 | 2 | 1 | 1 |

F I G. 15A 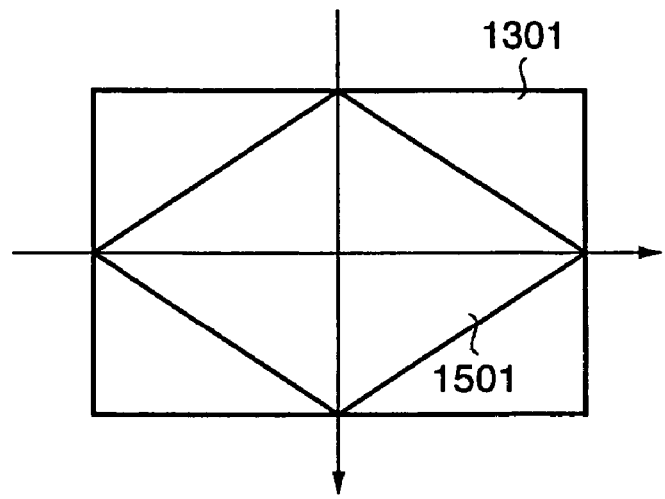
F I G. 15B 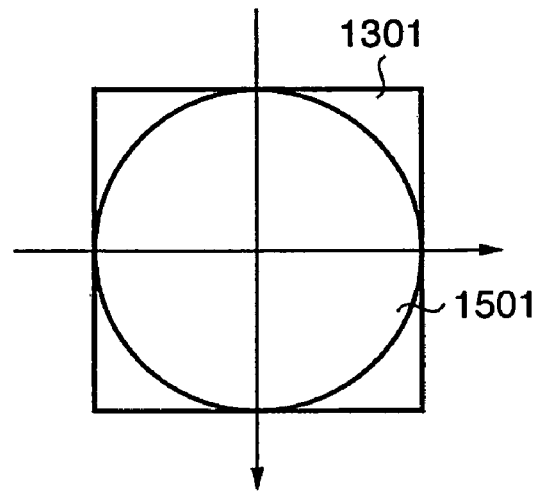
F I G. 15C 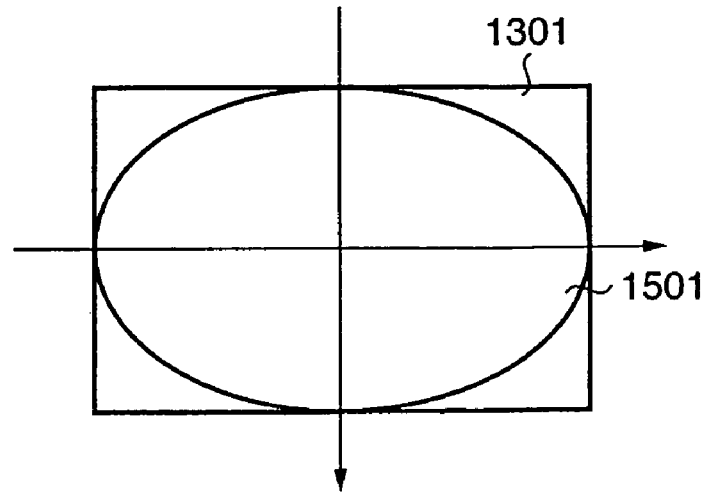

FIG. 31

| INDEX | UPPER LEFT COORDINATE | | BOTTOM RIGHT COORDINATE | |
|---|---|---|---|---|
| | x | y | x | y |
| 0 | 50 | 30 | 55 | 35 |
| 1 | 100 | 30 | 105 | 35 |
| 2 | 80 | 205 | 90 | 210 |
| 3 | 130 | 205 | 140 | 210 |

F I G. 33
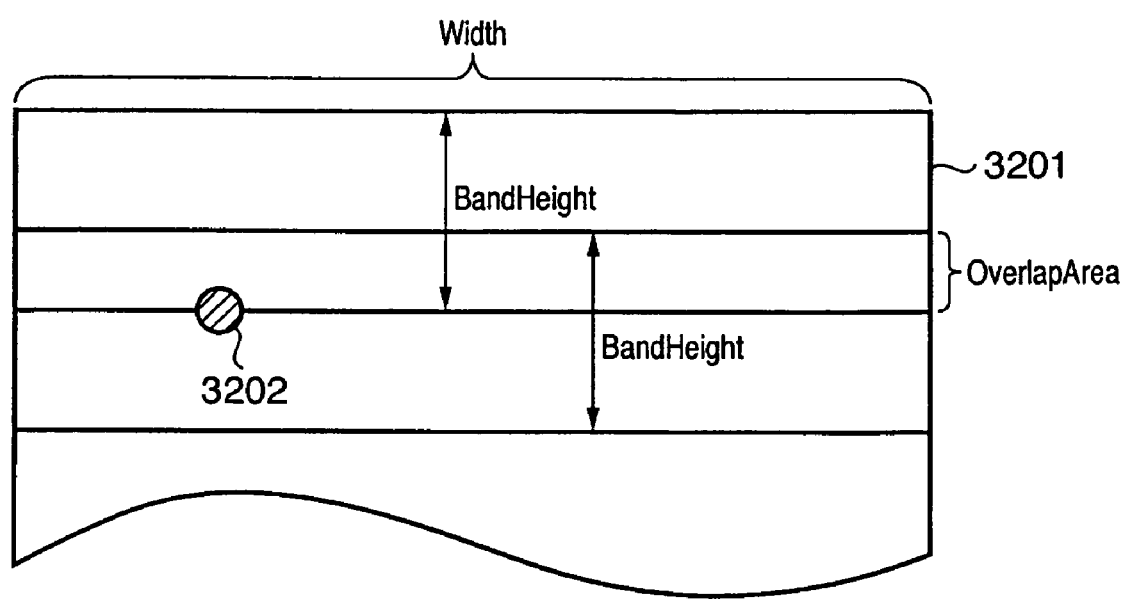

FIG. 38

| INDEX | UPPER LEFT COORDINATE | | BOTTOM RIGHT COORDINATE | | MAXIMUM LUMINANCE VALUE Ymax | MAXIMUM VALUE OF EVALUATION VALUES Ermax |
|---|---|---|---|---|---|---|
| | x | y | x | y | | |
| 0 | 50 | 30 | 55 | 35 | 228 | 96 |
| 1 | 100 | 30 | 105 | 35 | 208 | 89 |
| 2 | 80 | 205 | 90 | 210 | 198 | 92 |
| 3 | 130 | 205 | 140 | 210 | 212 | 87 |

IMAGE PROCESSING APPARATUS AND METHOD, COMPUTER PROGRAM, AND STORAGE MEDIUM DIVIDING AN INPUT IMAGE INTO BAND IMAGES

FIELD OF THE INVENTION

The present invention relates to an image processing apparatus and method and, more particularly, to image processing for detecting an image region exhibiting poor color tone of an eye image.

BACKGROUND OF THE INVENTION

A method of correcting poor color tone of an eye image due to a photographic flash of a camera has been proposed. Note that poor color tone of an eye image is generally well known as a red-eye effect. The red-eye effect is as follows. That is, when a person or an animal such as a dog, cat, or the like is photographed using a photographic flash in r an insufficient illumination environment, the flash light that has entered the opening pupil part of the eye is reflected by the eyeground, and the capillaries gleam red. Since a person who has a pale pigment color (or a light pigment) has a higher pupil transmittance, i.e., a crystal lens, the red-eye effect tends to occur more frequently with such a person.

In recent years, digital cameras have been reduced in size, and the optical axis of a lens thereof tends to approach the light source position of a photographic flash. In general, as the light source position of the photographic flash is closer to the optical axis of the lens, the red-eye effect occurs more readily, and taking measures against this phenomenon is critical.

As one means for preventing the red-eye effect, pre-light emission is performed before photographing, and taking a picture after the pupil of the object is closed is known. However, this method consumes more battery power than normal photographing, and changes the expression of the object due to the pre-light emission.

Many methods of compensating for a red-eye image by correcting and processing digital image data photographed by a digital camera using a personal computer have been proposed.

The methods of correcting the red-eye effect on digital image data are roughly classified into manual correction, semiautomatic correction, and automatic correction.

With the manual correction method, the user designates and corrects a red-eye region displayed on a display using a pointing device such as a mouse, stylus, tablet, or the like, or a touch panel.

With the semiautomatic correction method, the user roughly designates a region where a red-eye image exists, and correction is applied by specifying a correction range of the red-eye image based on that information. For example, the user designates a region that surrounds the two eyes using a pointing device, or designates one point near the eye. Based on information of this designated region or designated point, the correction range is specified to apply correction.

With the automatic correction method, a correction region is automatically detected from digital image data and correction processing is executed without any specific operation by the user.

In the manual or semiautomatic correction method, the user must designate a correction region by some operation. For this reason, the user must display the vicinity of a region to be corrected of image data in an enlarged scale, and must then designate the correction region, thus requiring a troublesome operations. In case of a computer system which comprises a large-screen display device or the like, such operations are relatively easy to attain. However, on a device such as a digital camera, a printer, or the like, which comprises only a display device of several inches, operations for enlarging an image, and designating the correction region by scrolling the image are not easy at all.

In recent years, various proposals about automatic correction of the red-eye effect, which can obviate the need for troublesome user's operations and are effective for a device which does not comprise any large display device have been made.

For example, Japanese Patent Laid-Open No. 11-136498 has proposed a method of correcting pixels which form a red-eye image by detecting a skin color region from an image, and detecting pixels which are likely to form the red-eye image in the detected region. Also, Japanese Patent Laid-Open No. 11-149559 has proposed a method of detecting a skin color region, detecting a bottom peak region corresponding to the low luminance level of a pupil from that region, and determining the location of an eye based on the distance between the first and second bottom peaks. Furthermore, Japanese Patent Laid-Open No. 2000-125320 has proposed a method of specifying a red-eye region by detecting a skin color region, judging if the skin color region has features of a human face, detecting a pair of red-eye images from that region, and evaluating the distance and size. Moreover, Japanese Patent Laid-Open No. 11-284874 has proposed a method of automatically detecting whether or not an image includes images of red pupils, detecting, when the images of the red pupils are detected, their positions and sizes, and automatically converting red color pixels in the images of the pupils into a predetermined color.

However, the automatic correction methods of the red-eye effects which have been proposed suffer the following problems.

Detection of a red-eye region based on the result of skin color detection of a person or face detection using a neural network has a highly reliable detection result, but it requires a large memory size and arithmetic volume since a given broad range in an image must be referred to. Therefore, such detection is suited to processing using a personal computer which comprises a high-performance CPU that operates at the clock frequency of several GHz and a several-hundred MB memory, but it is difficult to implement such detection method in an embedded system inside a digital camera or printer.

In the embedded system in the digital camera or printer, the available work memory is as low as several hundred KB or several MB at most. On the other hand, the resolutions of digital cameras are increasing, and cameras having image sensing capability beyond 10 million pixels are available. In order to execute processing for detecting a red-eye region from such high-resolution image using a limited work memory, it is effective to decrease the resolution of an input image. For example, it is possible to reduce an input image of eight million pixels to a ¼ resolution, i.e., an image of two million pixels by subsampling that image at one-pixel intervals in the horizontal and vertical directions. In this case, the capacity of the work memory required to store an image is reduced to ¼. However, even when the image size is reduced to two million pixels, a work memory of about 6 MB (in case of 24-bit RGB data) is required to simultaneously hold the entire reduced image. Such storage capacity does not pose any problem in a personal computer or workstation comprising a large-capacity RAM. However, under the limited memory resources available in a digital camera, further means are required to reduce the required work memory size.

Not only the aforementioned automatic correction examples, but also most of the methods proposed so far specify a red-eye region by utilizing a feature that the red-eye region has a higher saturation level than a surrounding region. However, a determination based on saturation is not always suited to a person who has a dark pigment color (or a rich pigment). As is well known, when a pixel value is given by an RGB system, a saturation value S is given by:

$$S = \{\max(R,G,B) - \min(R,G,B)\} / \max(R,G,B) \quad (1)$$

where max(R, G, B) is the maximum value of RGB components, and min(R, G, B) is the minimum value of RGB components.

For example, as is apparent from the experimental results, the skin color regions of Japanese people are distributed around 0 to 30° as the hue angle (0 to 359°). Note that a hue angle of an HSI system near 0° is red, and it becomes closer to yellow with increasing hue angle. The magnitude relationship of RGB values around 0 to 30° satisfies:

$$R > G > B \quad (2)$$

As described above, a person who has a dark pigment color (or a rich pigment) hardly ends up with a bright red-eye image compared to a person who has a pale pigment color (or a light pigment).

In consideration of these facts, the pixel values of the red-eye region and skin color region around the eyes of the Japanese can be estimated as:

Red-eye region: (R, G, B)=(109, 58, 65)

Skin color region: (R, G, B)=(226, 183, 128)

In the above case, the saturation value of pixels (to be referred to as "red-eye pixels" hereinafter) of the red-eye region is 40, and that of pixels of the skin color region is 43, i.e., these saturation values are roughly equal to each other. In other words, even when attention is focused on the saturation value, the red-eye pixels cannot often be specified, depending on the objects (persons) that are the subject to a photographing operation.

SUMMARY OF THE INVENTION

The first aspect of the present invention relates to an image processing apparatus comprising a divider, arranged to divide an input image into band images each including a predetermined number of lines so that an overlap area exists between neighboring band images; an extractor, arranged to extract candidate pixels which form an image region exhibiting poor color tone for each band image; and a decider, arranged to decide the band image which is to undergo a characteristic amount determination for the candidate pixels, based on a position of a candidate region including the candidate pixels in the overlap area.

The second aspect of the present invention relates to an image processing apparatus for detecting an image region exhibiting poor color tone of an eye image, comprising a divider, arranged to sequentially divide an input image into band images each including a predetermined number of lines so that an overlap area exists between neighboring band images; a calculator, arranged to calculate evaluation values of the poor color tone based on predetermined color components for each band image and for respective pixels of that band image; a pixel extractor, arranged to extract candidate pixels, which form the image region indicating the poor color tone, based on the evaluation values for each band image; a region extractor, arranged to extract a candidate region having a predetermined shape which is formed by the candidate pixels for each band image; and a decider, arranged to decide based on characteristic amounts associated with the eye image calculated from the candidate region for each band image whether or not the candidate region is set as a correction region.

According to the present invention, an image region exhibiting poor color tone of an eye image can be detected with high precision in a device environment in which the memory resources that can be assigned to the detection are limited. Therefore, the image region exhibiting poor color tone of the eye image (image region to be corrected) can be appropriately detected independently of the characteristics of persons who have a pale or dark pigment color (or a light or rich pigment).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 conceptually shows a red-eye image sensed by an image sensing device such as a digital camera or the like;

FIG. 10 shows an example of a direction histogram;

FIGS. 15A to 15C are views showing calculation regions of the average value Er(ave) of blocks;

FIG. 31 shows an example of a candidate region list;

FIG. 33 is a view for explaining band division in the fifth embodiment;

FIG. 38 shows an example of a candidate region list;

DESCRIPTION OF THE PREFERRED EMBODIMENTS

Image processing according to preferred embodiments of the present invention will be described in detail hereinafter with reference to the accompanying drawings. Note that the image processing to be described hereinafter is desirably incorporated in a printer driver which generates image information to be output to a printer engine, and runs in a computer. Alternatively, the image processing to be described hereinafter is desirably incorporated in a scanner driver which drives an optical scanning device such as a scanner or the like, and runs in a computer. Alternatively, the image processing to be described hereinafter may be built in hardware such as a copying machine, a facsimile machine, a printer, a scanner, a digital camera, a digital video camera, or the like, or it may be supplied as software.

First Embodiment

Arrangement of Apparatus

Figure 1:
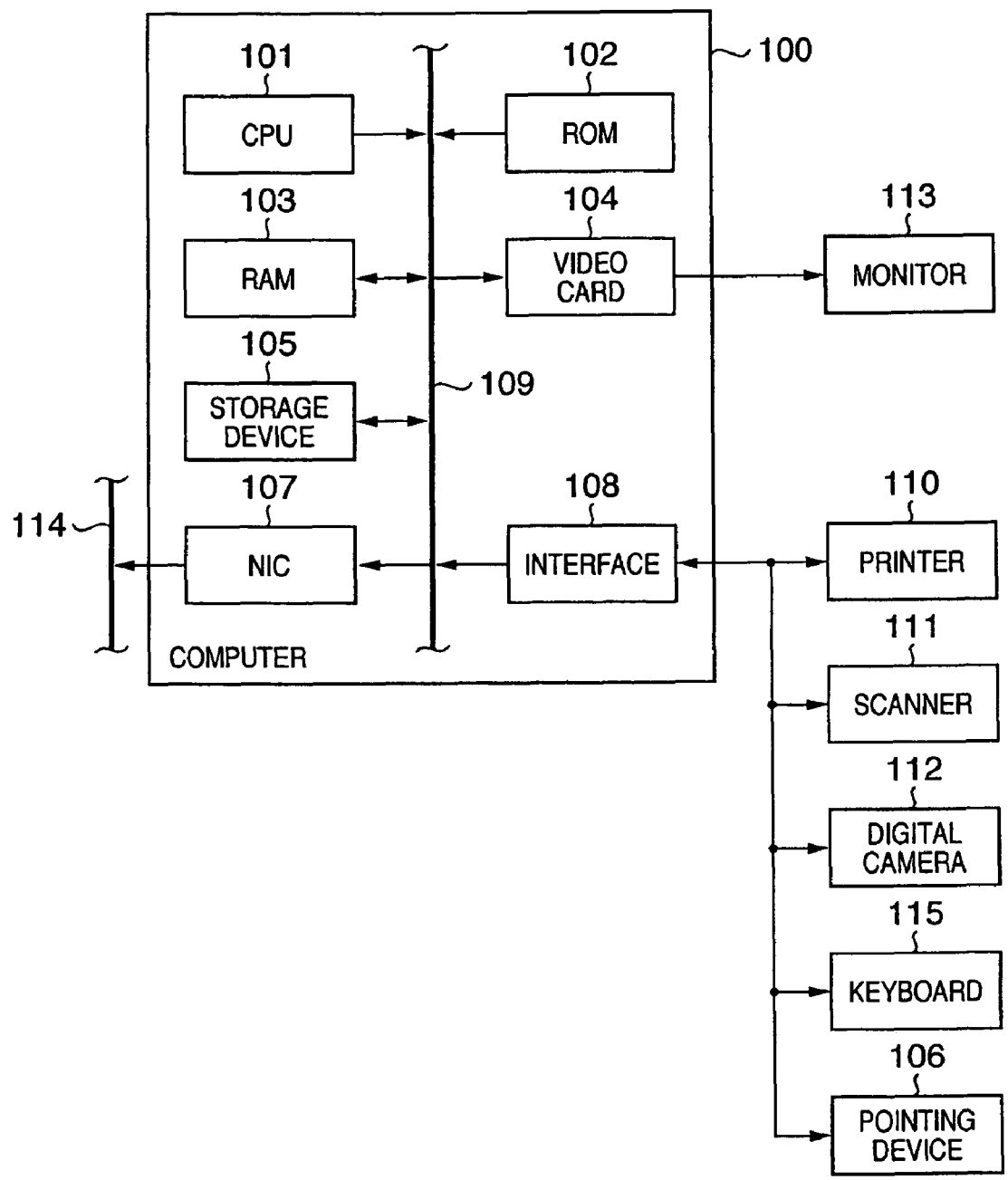
FIG. 1 is a block diagram showing the arrangement of a computer (image processing apparatus) which executes image processing of the first embodiment.

FIG. 1 is a block diagram showing the arrangement of a computer (image processing apparatus) which executes image processing of the first embodiment.

A computer 100 comprises a CPU 101, a ROM 102, a RAM 103, a video card 104 which connects a monitor 113 (which may comprise a touch panel), and a storage device 105 such as a hard disk drive, memory card, and the like. Also, the computer 100 comprises an interface 108 for a serial bus such as USB, IEEE1394, or the like, which connects a pointing device 106 such as a mouse, a stylus, a tablet, or the like, a keyboard 107, and the like. Furthermore, the computer 100 comprises a network interface card (NIC) 107 which connects a network 114. These components are interconnected via a system bus 109. A printer 110, a scanner 111, a digital camera 112, and the like can be connected to the interface 108.

The CPU 101 loads programs (including a program of image processing to be described below) stored in the ROM 103 or storage device 105 onto the RAM 103 as a work memory, and executes the programs. By controlling the above components via the system bus 109 in accordance with the programs, the CPU 101 implements the functions of the programs.

Note that FIG. 1 shows the general arrangement of hardware that implements image processing to be described in the first embodiment, and the arrangement from which some components are omitted or to which other devices are added is included in the scope of the present invention.

[Overview of Processing]

Figure 2:
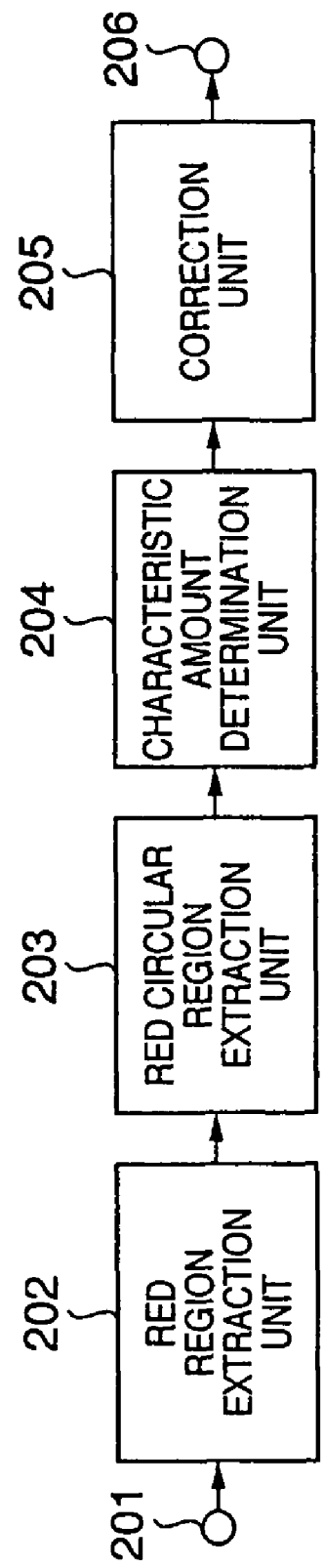
FIG. 2 is a functional block diagram showing an overview of automatic correction processing of a red-eye image according to the first embodiment.

FIG. 2 is a functional block diagram showing an overview of automatic correction processing of a red-eye image according to the first embodiment. This processing is executed by the CPU 101. Note that an input image is digital image data which is input from, e.g., the digital camera 112 or a film scanner 111 and is expressed by 8-bit RGB data, i.e., a total of 24 bits per pixel.

Figure 3:
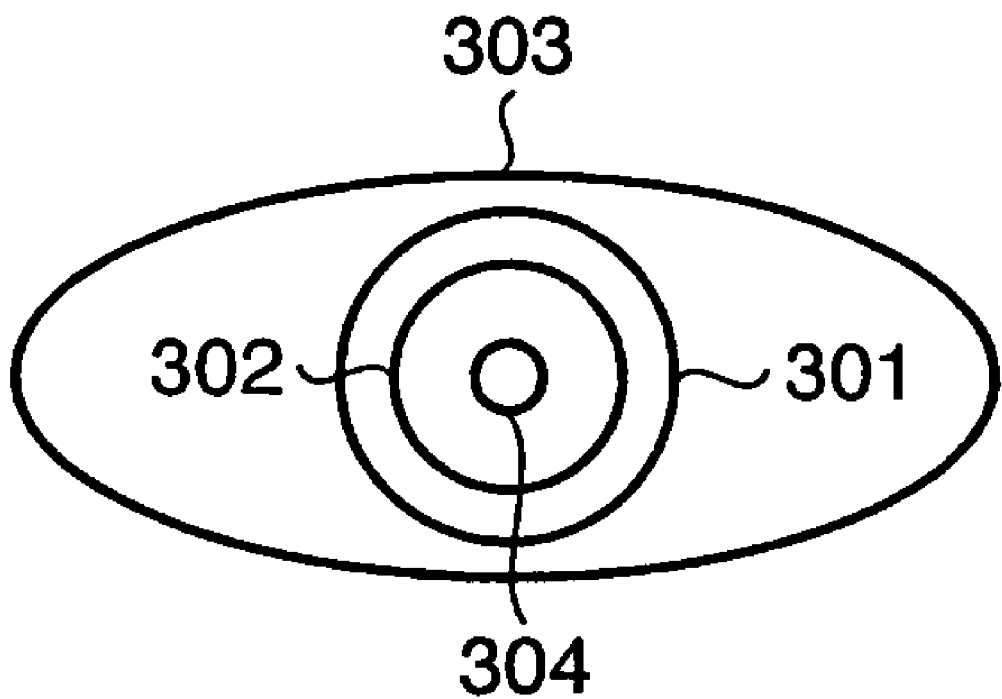

FIG. 3 conceptually shows a red-eye image sensed by an image sensing device such as the digital camera 112 or the like, and illustrates a pupil region 302 and iris region 301 of an eye, and a highlight region 304 due to photographic flash light used in photographing. Reference numeral 303 denotes a white portion. Normally, the pupil region 302 becomes red due to the red-eye effect.

A red region extraction unit 202 shown in FIG. 2 extracts regions of a red color (to be referred to as "red color regions" hereinafter) from image data input from an input terminal 201. Various extraction methods of red color regions may be used, and an extraction method of red color regions based on adaptive binarization will be described later. Since the red region extraction unit 202 extracts red color regions independently of the eyes that are imaged, the extracted red color regions include various ones such as red eyes, a red signal, a red pattern of cloth, a red illumination, and the like.

A red circular region extraction unit 203 receives input image data and information of the extracted red color regions, and specifies regions whose shape is relatively approximate to a circle (to be referred to as "red circular regions" hereinafter) from the red color regions. Various determination methods of a region shape may be used, and an extraction method of a red circular region based on boundary tracing will be described later. Note that the red circular region extraction unit 203 stores position information of the extracted red circular regions in a candidate region list.

A characteristic amount determination unit 204 receives the input image data and candidate region list, and executes determination processing of various characteristic amounts which allow the apparatus to specify eye images for the red circular regions recorded in the candidate region list. Characteristic amounts which allow the apparatus to specify eye images include a saturation value of each red circular region, lightness, saturation, and hue values of each red circular surrounding region, an edge distribution, and the like. These characteristic amounts are compared with predetermined thresholds, and the red circular region which meets all conditions is specified as a red-eye region. Note that the characteristic amount determination unit 204 stores position information of the specified red-eye region in the candidate region list.

A correction unit 205 receives the input image data and the candidate region list which stores the position information of the red-eye region, applies correction processing to the red-eye region of the image data, and outputs the image data that has undergone the correction processing to an output terminal 206. The image data after the correction processing is displayed on the monitor 113 or is stored in the RAM 103 or storage device 105. Alternatively, the image data is printed by the printer 110 connected to the interface 108 or is transmitted to another computer or a server connected to the network 114 (including an intranet and Internet) via the NIC 107.

[Red Region Extraction Unit]

The red region extraction unit 202 extracts red color regions from image data by applying adaptive binarization processing to input image data. That is, the red region extraction unit 202 calculates a red color evaluation value for each pixel of the input image data, compares the evaluation value with a threshold, and determines an interest pixel as a red color pixel when the evaluation value>the threshold. This threshold is adaptively determined in a surrounding region of the interest pixel. Note that "binarization" means assigning '1' to a pixel which is determined as a red color pixel and '0' to other pixels.

Figure 4:
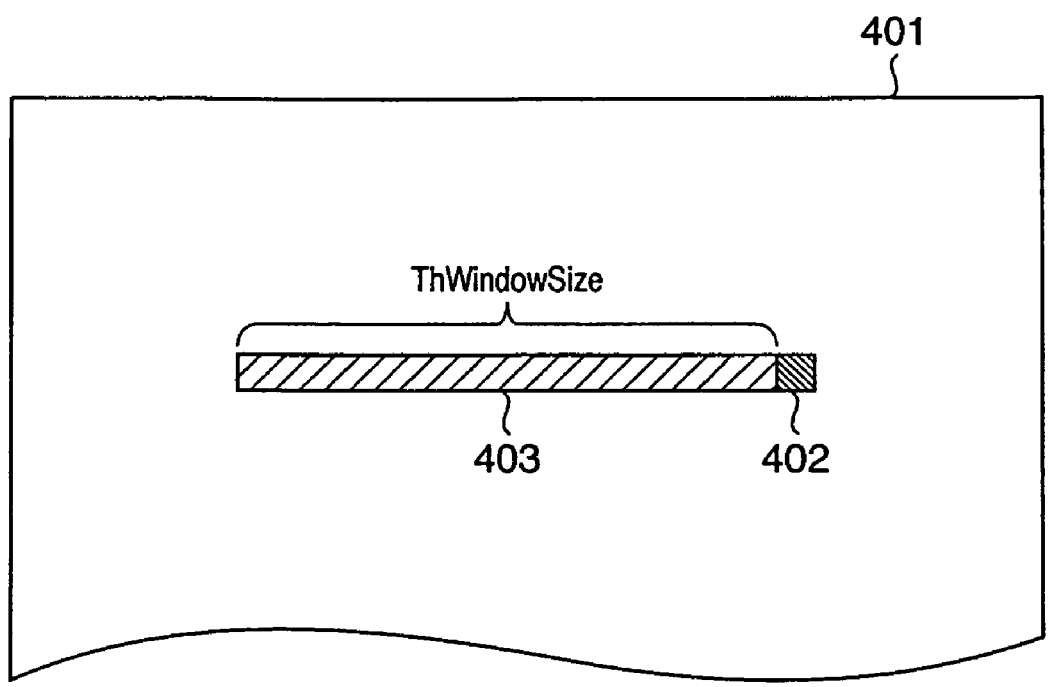
FIG. 4 is a view for explaining adaptive binarization processing.

FIG. 4 is a view for explaining the adaptive binarization processing.

Referring to FIG. 4, an interest pixel 402 of input image data 401 is a pixel which is to undergo binarization processing. The red region extraction unit 202 defines an evaluation value Er indicating a red color degree of the interest pixel 402 by:

$$Er=(R-G)/R \quad (3)$$

Equation (3) means that the red color degree of the interest pixel 402 is calculated from two components, i.e., R and G, which do not include r a B component and are used in place of the saturation value of the general HSI system. The advantage obtained when the red color evaluation value Er is defined by equation (3) in place of a saturation value will be described below.

For example, in case of a person who has a dark pigment color (or a rich pigment), since the transmittance of the crystal lens of the pupil region 302 is low, a bright red-eye image hardly tends to form. As described above, it is revealed by experiments that the estimated value of the pixel value of the red-eye region of the Japanese is (R, G, B)=(109, 58, 65), and the hue values of the skin color of many Japanese people are distributed within the range from red (0°) to yellow (60°). In such region, R, G, and B components meet R>G>B, and the estimated value of the pixel value of the skin color region around an eye is (R, G, B)=(226, 183, 128). In this manner, the pixels in both the red-eye region and the skin color region around the eye have small B components. In such case, the saturation value of the red-eye pixel is 40, and that of the pixel of the skin color region around the eye is 43, i.e., these saturation values are roughly equal to each other. That is, the saturation value of the pixel of the red-eye region especially does not stand out with respect to that of the pixel of the skin color region around the eye. Therefore, if the saturation value is used as the threshold of the adaptive binarization processing, it is difficult to detect the red-eye region.

On the other hand, when the red color evaluation value Er is defined using equation (3), i.e., an evaluation value which does not depend on a B component, the red color evaluation value Er of the pixel of the red-eye region is 47, and that of the skin color region around the eye is 19. Hence, the red color evaluation value Er of the pixel of the red-eye region assumes a value twice or more that of the skin color region around the eye.

As described above, upon detecting a red-eye image of a person who has a dark pigment color (or a rich pigment), since the evaluation value which does not include any B component and is based on only R and G components as in equation (3) is defined, pixels which form the red-eye image can be extracted with high precision. In equation (3), the ratio of (R−G) to an R component is used as the evaluation value Er. However, the present invention is not limited to such specific value. For example, only (R−G) or R/G may be used as the evaluation value Er.

Upon detection of a red-eye image of a person who has a pale pigment color (or a light pigment) as well, since the evaluation value which does not include any B component and is based on only R and G components as in equation (3) is defined, pixels which form the red-eye image can be extracted with high precision.

Referring back to FIG. 4, in order to binarize the interest pixel 402, a window 403 which has the number of pixels ThWindowSize in the left direction (front side of the main scan direction) with respect to the interest pixel 402 on the same line as the interest pixel 402 is set. Then, an average value Er(ave) of the red color evaluation values Er of the pixels in the window is calculated. Note that the number of pixels ThWindowSize desirably has a width about 1 to 2% of the short side of an image. The evaluation value Er never assumes a negative value since it is calculated only when the following conditions are met:

$$R>0 \text{ and } R>G \quad (4)$$

The interest pixel 402 is binarized using the average value Er(ave). In order to execute this processing, the interest pixel 402 must meet:

$$R>Th\_Rmin \text{ and } R>G \text{ and } R>B \quad (5)$$

where Th_Rmin is a threshold indicating the lower limit value of R.

When the above conditions are met, binarization processing is executed using:

if $Er>Er(ave)+\text{Margin\_}RGB$, '1' if $Er \leq Er(ave)+\text{Margin\_}RGB$, '0' (6)

where Margin_RGB is a parameter.

Formulas (6) set the binarized value of the interest pixel 402 to '1' when the red color degree Er of the interest pixel 402 is larger than the sum of the average value Er(ave) of the window 403 and Margin_RGB. That is, this means that the interest pixel 402 is extracted as the red-color region. When the red color region is continuous, since the average value Er(ave) becomes too large, the upper limit of the average value Er(ave) may be set. This binarization result is saved in an area assured in the RAM 103 independently of a buffer for the input image.

The aforementioned processing is applied to all pixels by shifting the interest pixel 402 from the left to right in each line unit of the input image data.

In the first embodiment, the threshold for binarization (average value Er(ave)) is calculated from the evaluation values Er of pixels in the window, which is set in the left direction on the same line as the interest pixel 402. However, the present invention is not limited to this. For example, a region which includes several pixels in the left direction (front side of the main scan direction) of the interest pixel 402 on several lines above (front side of the sub-scan direction) of the line that includes the interest pixel 402, or a rectangular region having the interest pixel 402 as the center may be set as the window.

Figure 5A:
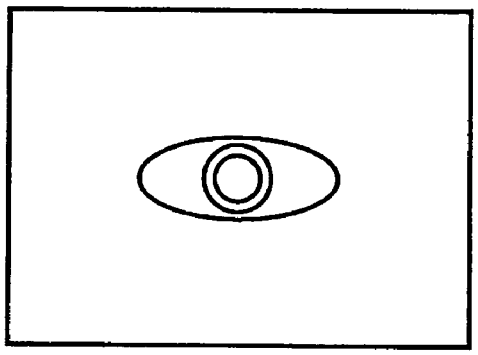
FIGS. 5A and 5B show an example of the adaptive binarization result.
Figure 5B:
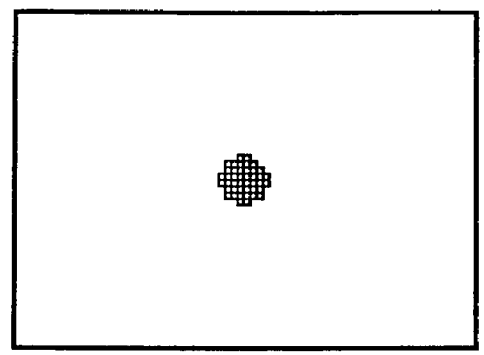

FIGS. 5A and 5B show an example of the adaptive binarization result. FIG. 5A shows an image around a red-eye image of the input image data, and FIG. 5B shows a binary image as a result of adaptive binarization, and illustrates a state wherein only pixels of the pupil portion of the red-eye image are extracted.

Upon calculating the average value Er(ave) of the evaluation values in the window set in the main scan direction, the following speeding up method may be used.

Figure 6A:
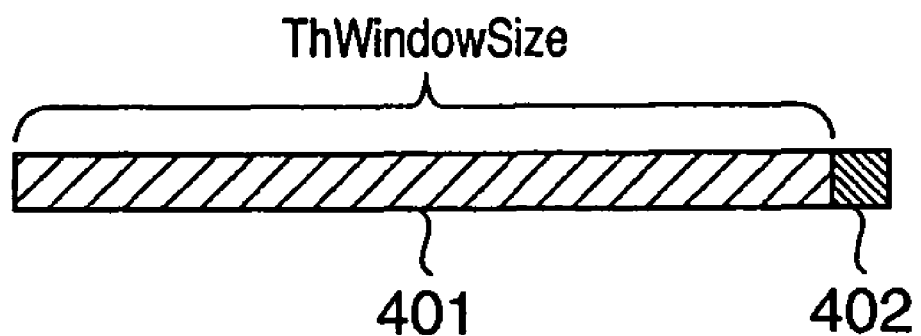
FIGS. 6A and 6B are views for explaining the speeding-up method upon calculating an average value Er(ave)
Figure 6B:
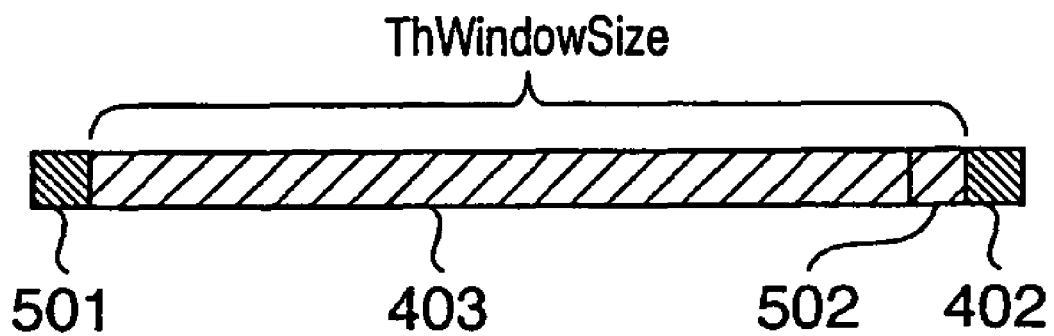

FIGS. 6A and 6B are views for explaining the speeding up method upon calculating the average value Er(ave).

Referring to FIG. 6A, when the average value Er(ave) in the window 403 set in the left direction of the interest pixel 402 is to be calculated, the sum total of the evaluation values Er in the window 402 is stored in a memory (e.g., the RAM 103). The average value Er(ave) can be easily calculated by dividing the sum total by the number n of pixels which form the window 403. Next, the interest pixel 402 is shifted to the right by one pixel. In this case, the window 403 is also shifted to the right by one pixel. At this time, the sum total of the evaluation values Er in the window 403 is calculated by subtracting the evaluation value Er of a pixel 501 from the sum total calculated in FIG. 6A, and adding the evaluation value of a pixel 502 (immediately preceding interest pixel 402), thus speeding up the processing. That is, after the interest pixel 402 and window 403 are shifted, the evaluation values of all pixels in the window 403 need not be calculated again.

[Red Circular Region Extraction Unit]

The red circular region extraction unit 203 extracts red circular regions using the boundary tracing method as one of binary image processing methods.

Figure 7:
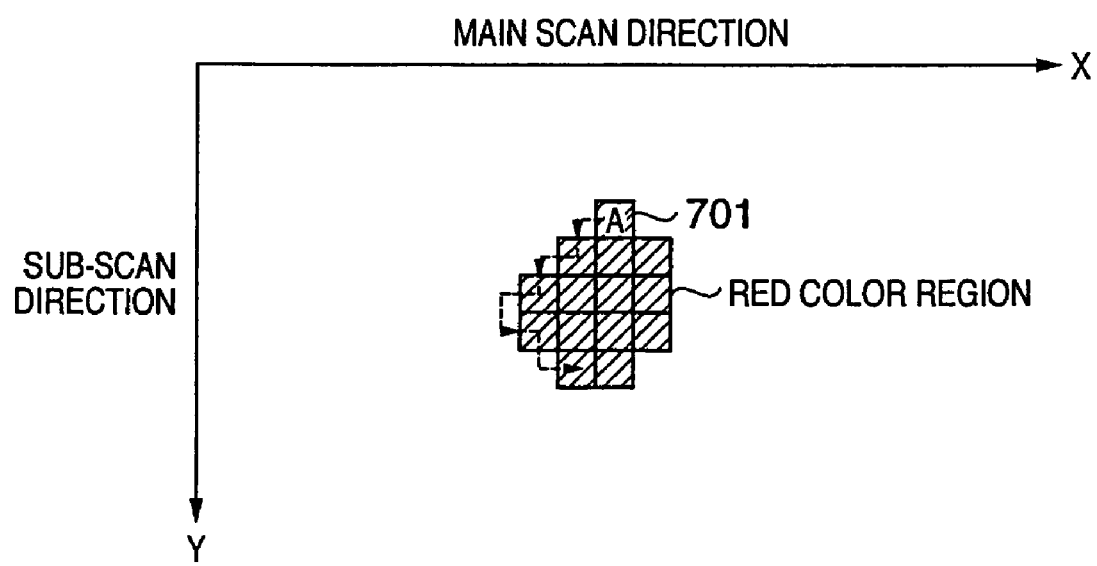
FIGS. 7 and 8 are views for explaining a boundary tracing method.

FIG. 7 is a view for explaining the boundary tracing method.

The boundary tracing processing scans the binary image obtained as a result of the adaptive binarization processing from its upper end in the main scan and sub-scan directions. Then, an interest pixel (xa, ya) which assumes a value '1' and has four pixels, i.e., a left pixel (xa−1, ya), obliquely upper left pixel (xa−1, ya−1), upper pixel (xa, ya−1), and obliquely upper right pixel (xa+1, ya−1) that have a value '0', is detected. The detected pixel is set as an origin pixel (a pixel denoted by reference numeral 701 in FIG. 7). Note that FIG. 7 sets a coordinate system which has the upper right position of the binary image as an origin.

Figure 8:
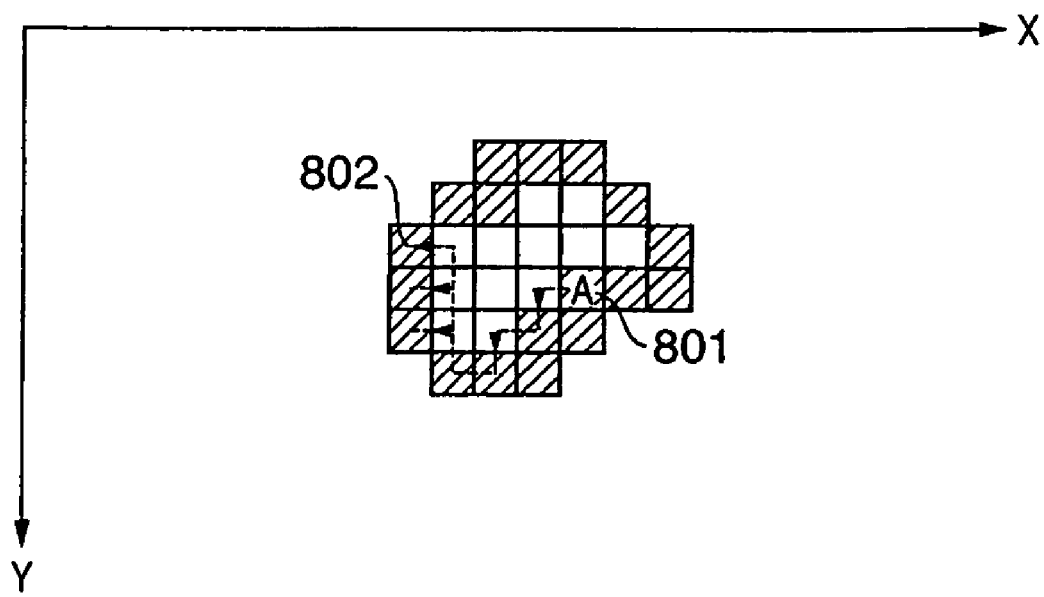

Then, pixels which assume a value '1' are traced counterclockwise from the origin pixel 701 to reach the origin pixel 701 again. When the tracing path extends beyond the image region or the Y-coordinate value becomes smaller than that of the origin pixel 701 during tracing, the tracing is aborted, and the next origin pixel is explored. The reason why the tracing is aborted when the Y-coordinate value becomes smaller than that of the origin pixel 701 is to prevent the interior of an annular region shown in FIG. 8 from being erroneously traced. When the interior of such annular region is traced, if a pixel 802 is reached in FIG. 8, the Y-coordinate value becomes smaller than that of an origin pixel 801, and the tracing is aborted here.

During the tracing process, the perimeter, the direction histogram, and the maximum and minimum values of X- and Y-coordinates of the region to be traced can be obtained. Note that the perimeter corresponds to the number of traced pixels. For example, in the example of FIG. 7, the number of traced pixels is nine including the origin pixel 701.

Figure 9:
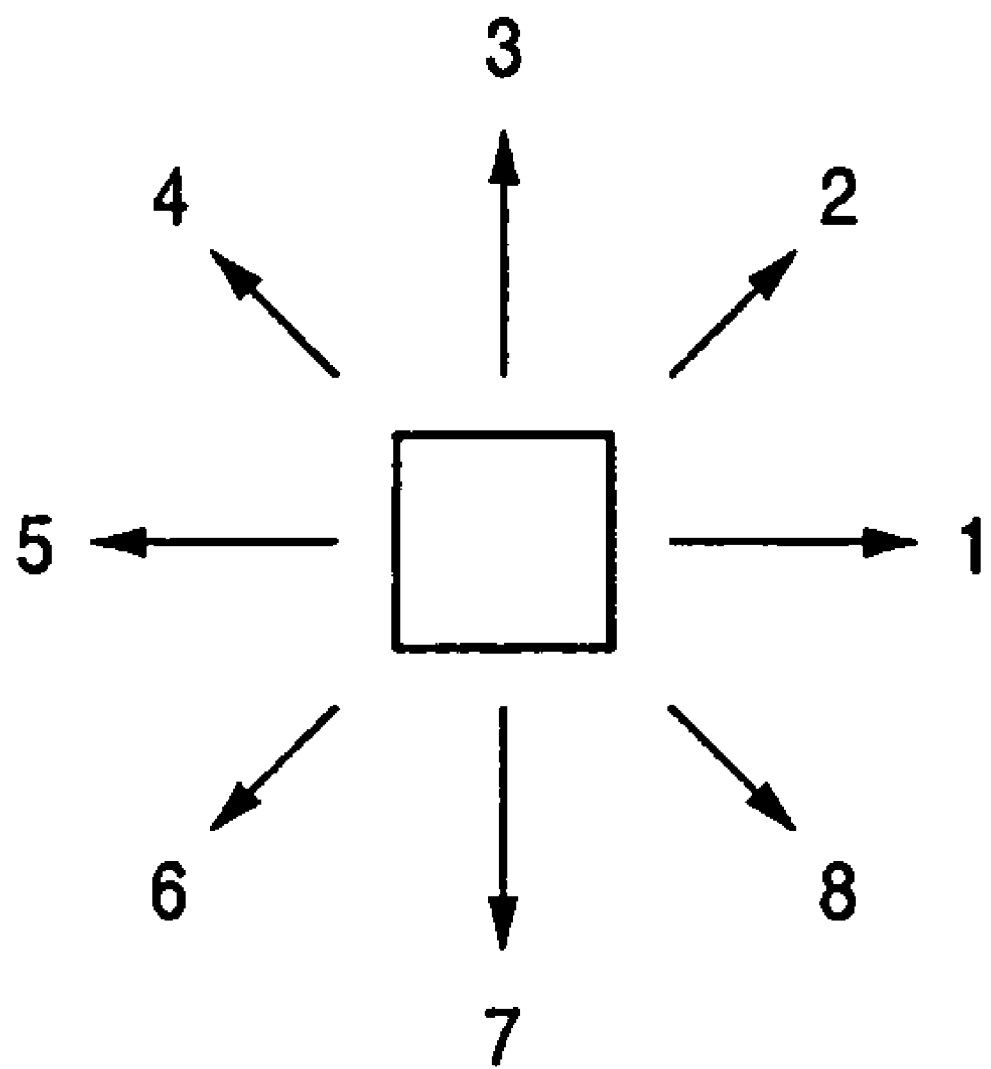
FIG. 9 shows the directions of a tracing direction histogram.

The direction histogram is obtained by accumulating a moving direction from a given pixel to the next pixel in eight directions shown in FIG. 9. In the example of FIG. 7, when tracing is done counterclockwise from the origin pixel 701, the moving directions are "667812334", and the direction histogram is as shown in FIG. 10.

Figure 11:
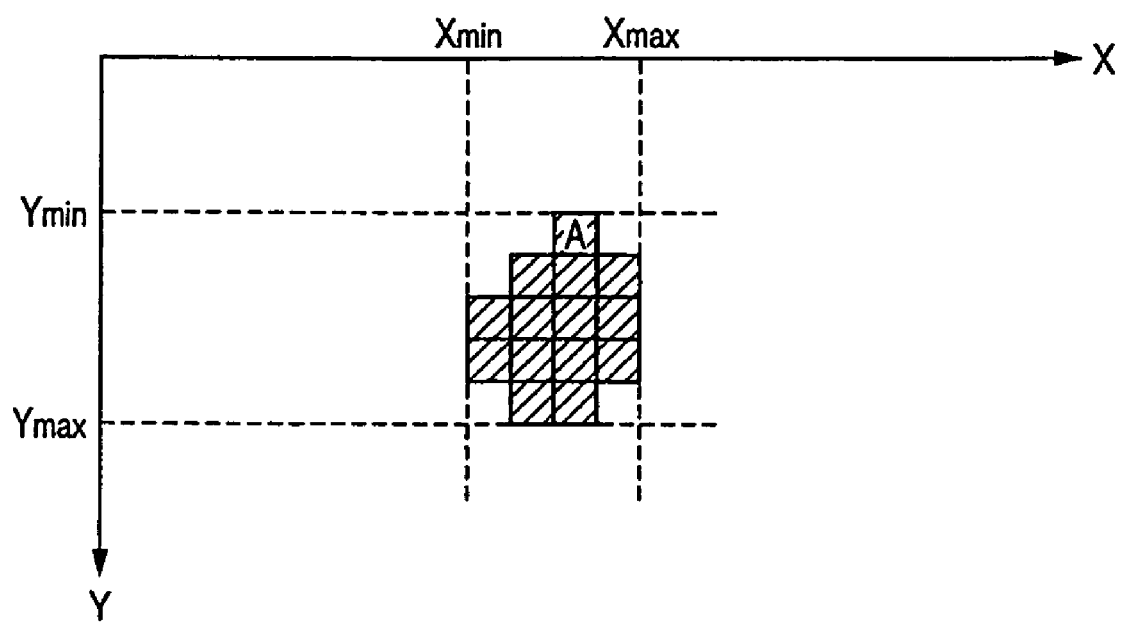
FIG. 11 shows a circumscribed rectangular region of a red color region.

The maximum and minimum values of the X- and Y-coordinates indicate a region where pixels having a value '1' exist, i.e., a circumscribed rectangular region of a red color region, as shown in FIG. 11.

The red circular region extraction unit 203 applies boundary tracing to respective red color regions to acquire the aforementioned values, and determines whether or not each red color region is a red circular region.

Figure 12:
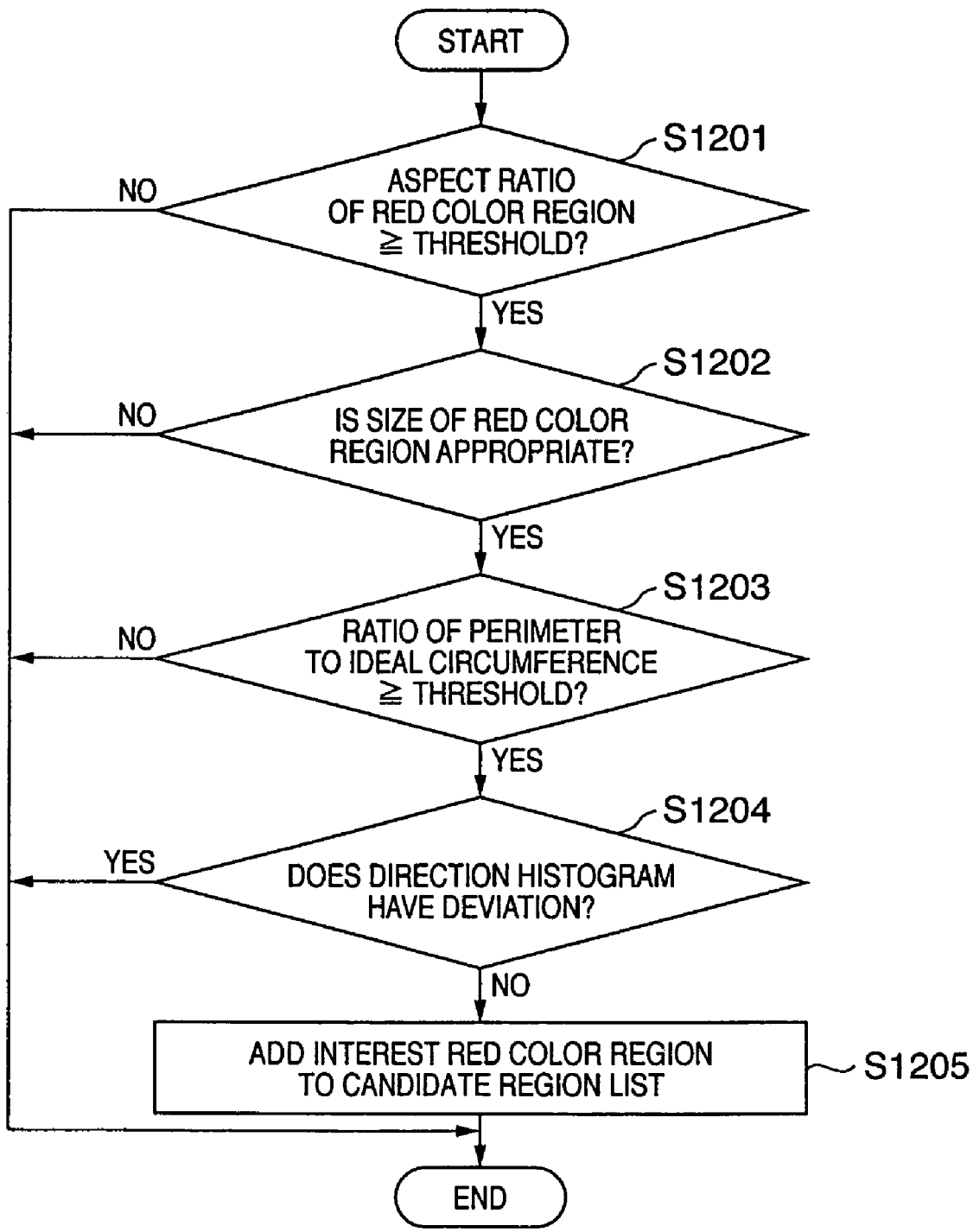
FIG. 12 is a flowchart showing processing for determining whether or not an interest region is a red circular region.

FIG. 12 is a flowchart showing an example of processing for determining whether or not an interest region is a red circular region.

It is checked if an aspect ratio AR of a red color region is equal to or larger than a threshold Th_BF_VHRatio which is set in advance (S1201). The aspect ratio AR is calculated by:

$$AR = (y\max - y\min)/(x\max - x\min) \tag{7}$$

for AR=1/AR if AR>1

That is, the aspect ratio AR is expressed by the range from 0.0 to 1.0, and when AR=1.0, the vertical and horizontal lengths are equal to each other. In step S1201, the aspect ratio AR is compared with Th_BF_VHRatio, and if AR<Th_BF_VHRatio, it is determined that the interest red color region is not a red circular region, and the next red color region is explored.

If AR≧Th_BF_VHRatio, it is checked if the size of the red color region is appropriate (S1202). The size is determined by checking two conditions, i.e., (i) the upper and lower limits of the actual number of pixels, and (ii) a ratio to the short or long side of an image.

As for condition (i), a smaller one of a horizontal width X=xmax−xmin and a vertical width Y=ymax−ymin of the red color region is compared with a threshold which is set in advance. Also, it is checked if the vertical or horizontal width falls within the range between an upper limit Th_BF_SizeMax and lower limit Th_BF_SizeMin. If the vertical width Y or horizontal width X falls outside the range between the upper and lower limits, it is determined that the interest red color region is not a red circular region, and the next red color region is explored.

Condition (ii) is determined by checking:

$$Th\_BF\_RatioMin < \min(X,Y)/\min(W,H) < Th\_BF\_RatioMax \tag{8}$$

where

X=xmax−xmin,

Y=ymax−ymin,

W is the width of the input image, and

H is the height of the input image.

If the interest red color region does not satisfy inequality (8), it is determined that the interest red color region is not a red circular region, and the next red color region is explored. Note that comparison of two short sides is exemplified as inequality (8). However, two long sides may be compared.

If it is determined in step S1202 that the size is appropriate, the perimeter is compared with an ideal circumference to check if the extracted red color region is approximate to a circle (S1203). From the width X and height Y of the red color region, an ideal circumference Ci is approximately calculated using:

$$Ci = (X+Y) \times 2 \times 2\pi/8 \quad (9)$$

Equation (9) calculates the circumference of a circle which inscribes a square under the assumption that the extracted red color region is a square. In equation (9), (X+Y)×2 indicates the length of the four sides of the square that includes the red color region, and 2π/8 indicates the ratio of the length of the four sides of the square to the circumference of the circle which inscribes the square. The ideal circumference Ci is compared with the perimeter by:

$$\min(Ci, Cx)/\max(Ci, Cx) > Th\_BF\_CircleRatio \quad (10)$$

where Cx is the perimeter.

If inequality (10) is not satisfied, it is determined that the interest red color region is not a red circular region, and the next red color region is explored.

If the perimeter satisfies inequality (10), a determination about deviation of the direction histogram is made (S1204). As has already been described above, the histogram of directions shown in FIG. 10 can be obtained in the process of boundary tracing. If the objective region of the boundary tracing is approximate to a circle, the direction histogram of eight directions obtained as a result of the tracing processing has a uniform distribution. However, if the objective region is elongated, the direction histogram suffers a deviation. For example, if the objective region has an elongated shape from the upper right position to the lower right position, of the directions shown in FIG. 9, the frequencies of occurrence concentrate in directions 2 and 6 and the frequencies of occurrence become small in directions 4 and 8. Therefore, if all of conditions given by inequalities (11) below are satisfied, it is determined that the interest red color region is a red circular region; if even one of the conditions is not satisfied, it is determined that the interest red color region is not a red circular region, and the next red color region is explored.

$$\text{sum}(f1, f2, f5, f6) < \Sigma f \times Th\_Bf\_DirectRatio$$

$$\text{sum}(f2, f3, f6, f7) < \Sigma f \times Th\_Bf\_DirectRatio$$

$$\text{sum}(f3, f4, f7, f8) < \Sigma f \times Th\_Bf\_DirectRatio$$

$$\text{sum}(f4, f5, f8, f1) < \Sigma f \times Th\_Bf\_DirectRatio \quad (11)$$

where fn is the frequency of occurrence in direction n, sum(fa, fb, fc, fd) is the sum of the frequencies of occurrence in directions a, b, c, and d, and Σf is the sum total of the frequencies of occurrence.

If the sum of the frequencies of occurrence calculated for given directions is larger than the predetermined ratio in inequalities (11), i.e., if the frequencies of occurrence are concentrated in the given directions, it is determined that the interest red color region is not a red circular region. The determination precision of determination using inequalities (11) may decrease when the sum total Ef of the frequencies of occurrence is small. Hence, if the sum total Ef of the frequencies of occurrence is equal to or smaller than a predetermined value, the control may skip the processing in step S1204, and may advance to step S1205.

A red color region which satisfies all the determination conditions in steps S1201 to S1204 above (if step S1204 is skipped, the determination conditions in remaining steps S1201 to S1203 are used) is determined as a red circular region (red-eye region candidate). Then, the coordinate position of the extracted red circular region is stored in the candidate region list assured in the RAM 103 (S1205), and boundary tracing and the determination processing shown in FIG. 12 are repeated until the vicinity of the lower right position of the image data is reached.

[Characteristic Amount Determination Unit]

The characteristic amount determination unit 204 calculates various characteristic amounts which allow the apparatus to specify a red-eye image of a person from each extracted red circular region (red-eye candidate region), and compares them with thresholds which are set in advance to check if that red circular region is a red-eye image.

Figure 16:
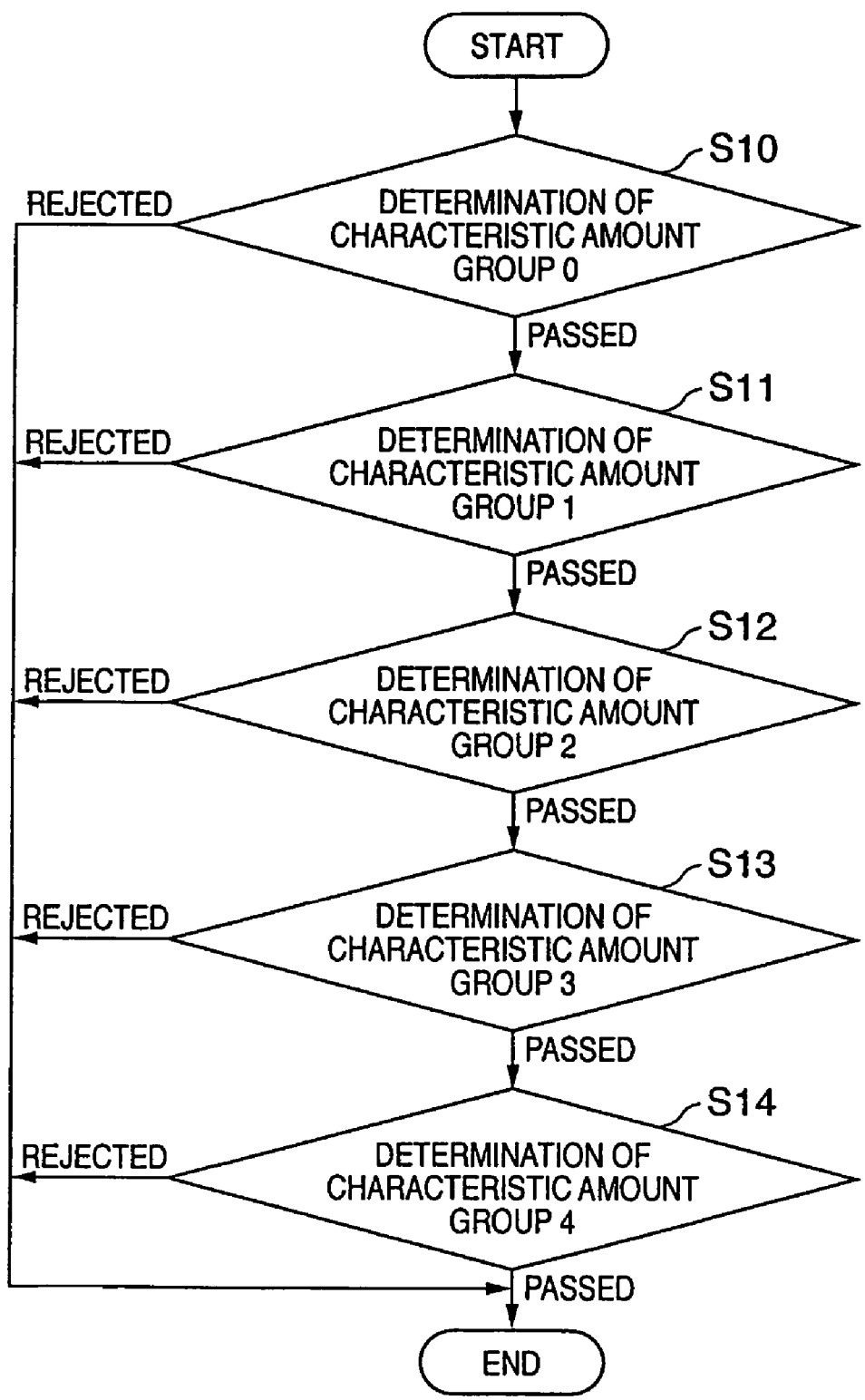
FIG. 16 is a flowchart showing the determination sequence of characteristic amount groups.

The characteristic amount determination unit 204 executes a determination of the following five characteristic amount groups for respective red-eye candidate regions recorded in the candidate region list by the processing executed so far in the order shown in FIG. 16.

Characteristic amount group 0: comparison of the average values Er(ave) of the evaluation values of each red circular region and surrounding region (S10)

Characteristic amount group 1: determination about changes in hue, evaluation value Er, and color component in each red circular region (S11)

Characteristic amount group 2: determination about luminance of a surrounding region (S12)

Characteristic amount group 3: determination about saturation and hue of a surrounding region (S13)

Characteristic amount group 4: determination about the edge magnitude of a surrounding region (S14)

A red color component of an ideal red-eye region has a feature that it outstandingly exists only in the pupil portion compared to its surrounding region. It is revealed by experiments that this feature appears most prominently compared to various other characteristic amounts. Therefore, it is efficient to execute the determination processing of the characteristic amount group 0 (S10) first to narrow down red-eye candidate regions.

The determination of characteristic amount group 1 (S11) requires a smaller arithmetic volume than determinations of the other characteristic amount groups since the characteristic amount determination is done with reference to pixels only in each red-eye candidate region.

The determinations of characteristic amount groups 2 and 3 (S12, S13) require a larger arithmetic volume than the determination of characteristic amount group 1, since they require processing for converting RGB components of pixels which exist in a set surrounding region into luminance and color difference components, and processing for converting the RGB components of those pixels into lightness, saturation, and hue components.

The determination of characteristic amount group 4 (S14) uses a known edge detection filter, such as a Sobel filter, to obtain the edge magnitude. For this reason, this determination processing requires the largest arithmetic volume compared to the determinations of other characteristic amount groups.

Therefore, the characteristic amount determination unit 204 executes a determination with a smaller arithmetic volume or which allows the apparatus to easily grasp features of a red-eye region first. Then, for a red-eye candidate region which is determined by such determination processing to not be a red-eye region, the following determination steps are skipped, as shown in FIG. 16, thus suppressing the processing volume of the characteristic amount determination unit 204.

Definition of Surrounding Region

Figure 13C:
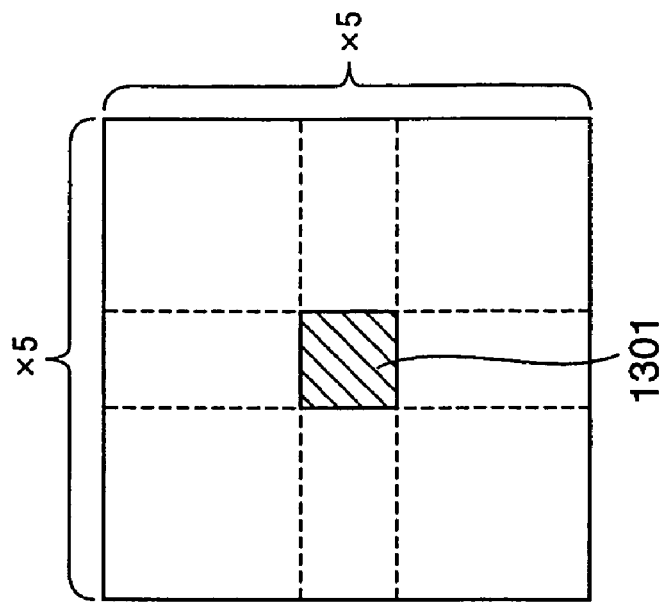
FIGS. 13A to 13C are views for explaining the definitions of surrounding regions used upon calculating the characteristic amounts of a red-eye candidate region.
Figure 13B:
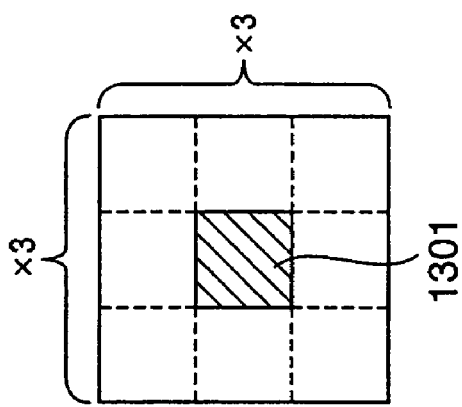
Figure 13A:
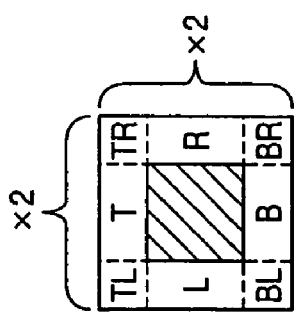

FIGS. 13A to 13C are views for explaining definitions of surrounding regions used upon calculating the characteristic amounts of a red-eye candidate region.

In FIGS. 13A to 13C, a central block 1301 is a circumscribed rectangle of a red-eye candidate region (red circular region) extracted by the precious processing. A surrounding region is obtained by enlarging the vertical and horizontal sizes of the block 1301 to twice, three times, and five times peripherally. FIGS. 13A to 13C respectively show surrounding regions of respective magnifications. In the following description, the phrase "entire surrounding region" means a portion of the image obtained by excluding the block 1301 from that surrounding region. Also, the phrase "blocks of the surrounding region" refers to respective blocks obtained by lengthening the sides of the block 1301 and dividing the surrounding region into eight blocks, as shown by broken lines in FIGS. 13A to 13C. The determination processing of the characteristic amount groups except for characteristic amount group 1 is applied to this surrounding region. Such settings of the surrounding regions allow high-speed determination processing, since only the 5× region of the circumscribed rectangle of a red-eye candidate region is referred to at a maximum.

Figure 14B:
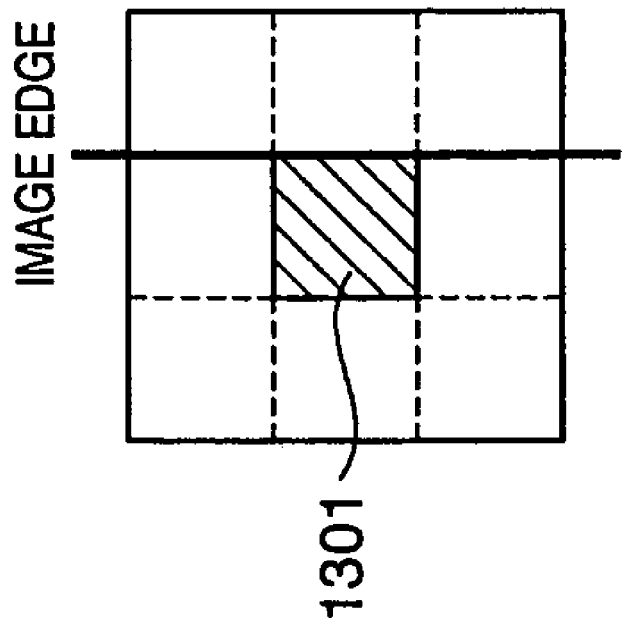
FIGS. 14A and 14B are views for explaining surrounding regions when a red-eye candidate region exists in the vicinity of the edge of an image.
Figure 14A:
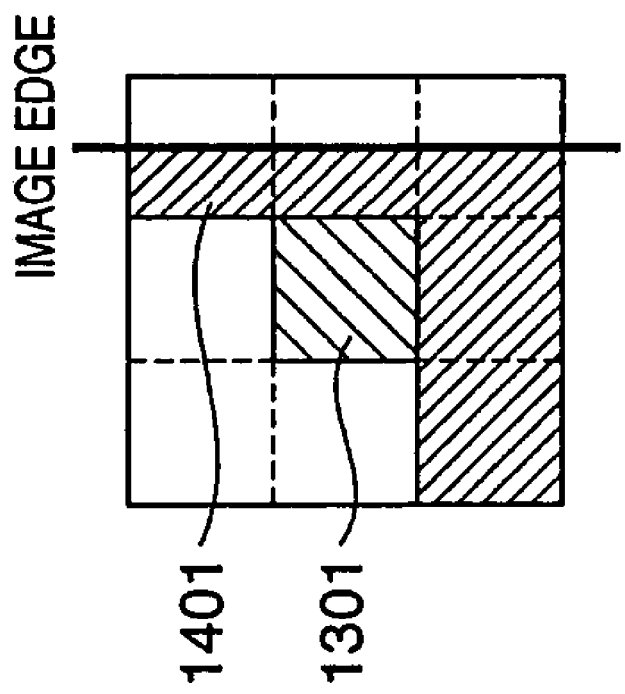

FIGS. 14A and 14B are views for explaining the surrounding region when a red-eye candidate region exists in the vicinity of the edge of an image.

FIG. 14A shows a case wherein the circumscribed rectangle (block 1301) of the red-eye candidate region exists near the right edge of an image while leaving a slight margin. In this case, if at least one pixel exists in respective blocks of the surrounding region, the characteristic amount determination is performed using that pixel.

On the other hand, FIG. 14B shows a case wherein the block 1301 contacts the right edge of an image without any margin. In this case, since there is no pixel in three adjacent blocks, i.e., the adjacent upper right block (TR), the adjacent right block (R), and the adjacent lower right block (BR), the characteristic amounts of these surrounding blocks cannot be calculated. In such case, in the first embodiment, the block 1301 is not determined as a red-eye region, and is excluded from the candidate region list.

Determination of Characteristic Amount Group 0 (S10)

In the determination processing of characteristic amount group 0, for example, a 3× region shown in FIG. 13B is set for the block 1301, evaluation values Er of respective pixels are calculated for respective blocks including the block 1301 using equation (3), and their average value Er(ave) is calculated. The calculated average value Er(ave) is stored in an array AEvR[8] assured in the RAM 103. Note that AEvR is an array which holds nine elements 0 to 8, which are assigned in turn from the upper left block to the lower right block, so that element 0 is assigned to the upper left (TL) block shown in FIG. 13A; element 1, the upper (T) block; element 2, the upper right (TR) block; . . . .

Next, it is checked if each of elements i=0 to 8 (excluding i=4 of the block 1301) satisfies:

$$AEvR[i] < AEvR[4] \times Th\_FJ0\_EvR \quad (12)$$

Inequality (12) means the following. That is, if a value obtained by multiplying the average value AEvR[4] of the evaluation values of the block 1301 by the threshold Th_FJ0_EvR is larger than the average values AEvR[i] of the evaluation values of the remaining eight surrounding blocks, it is determined that the interest red-eye candidate region is a red-eye region. If inequality (12) is not satisfied, it is determined that the interest red-eye candidate region is not a red-eye region, the determination steps of the remaining characteristic amount groups are skipped, and the next red-eye candidate region to be determined is selected.

Meanwhile, the reason why the evaluation values Er are compared using inequality (12) is that the feature of a red-eye region can be recognized most prominently among the characteristic amount groups to be described later. It is revealed as a result of various experiments that the determination using inequality (12) is most effective to exclude regions other than a red-eye region from the candidate region list. Therefore, by determining the characteristic amount that allows the apparatus to easily perform a red-eye-region determination as far as possible first, the arithmetic volume of the characteristic amount determination unit 204 can be minimized.

Upon calculating the average value Er(ave) of each block, it is desirable for the block 1301 to calculate the evaluation values Er of only pixels in a rhombic calculation region 1501 shown in FIG. 15A. Since a red-eye region generally has a circular or elliptic shape, pixels with small red color degrees exist at the four corners of the block 1301. For this reason, the evaluation values Er should be calculated for pixels except for the four corners of the block 1301 so as to prevent the average value Er(ave) of the evaluation values of the block 1301 from decreasing. Note that the calculation region 1501 of the evaluation values Er may have a circular shape (FIG. 15B) or elliptic shape (FIG. 15C) which inscribes the block 1301 in addition to the rhombic shape shown in FIG. 15A, so as to obtain an equivalent or better calculation result.

Determination of Characteristic Amount Group 1 (S11)

The determination of characteristic amount group 1 is a processing operation for determining whether or not an interest red-eye candidate region is a red-eye region with reference to image data in only that red-eye candidate region (the block 1301 shown in FIGS. 13A to 13C). The determination of characteristic amount group 1 includes, e.g., the following determination processes.

It is checked if the average value Er(ave) of the evaluation values of pixels, which have hue angles falling within the range of ±30° in an interest red-eye candidate region, is equal to or larger than a threshold Th_FJ1_EMin and is equal to or smaller than a threshold Th_FJ1_EMax. If this determination condition is not met, that interest red-eye candidate region is excluded from the candidate region list. Note that the hue angle can be obtained by a known method.

In the red-eye candidate region, the maximum and minimum values of the evaluation values Er of the pixels which have hue angles falling within the range of ±30° are obtained to calculate a ratio R=minimum value/maximum value. In the red-eye candidate region, since the evaluation values Er change largely, the ratio R assumes a small value to some extent. Therefore, determination is made using:

$$R < Th\_FJ1\_EMaxMinRatio \quad (13)$$

The interest red-eye candidate region which does not satisfy inequality (13) is excluded from the candidate region list.

Next, in the red-eye candidate region, the standard deviation of R components is measured. Since a red-eye region includes a bright red color region and a dark color region near the boundary of the pupil, the dynamic range of R components assumes a very large value. Therefore, by measuring the deviation of R components of the red-eye region, that value assumes a somewhat large value. Therefore, in the red-eye candidate region, a standard deviation Sr of R components is measured by a known method, and it is checked if Sr is larger than a threshold Th_FJ1_RDiv.

$$\delta r > Th\_FJ1\_RDiv \quad (14)$$

The red-eye candidate region which does not satisfy inequality (14) is excluded from the candidate region list. Note that the above description refers to the standard deviation of R components. However, if the variance of R components is used, similar determination can be attained.

As another method of determining a degree of change in R component, an average value SDr(ave) of the sums of differences of R components between neighboring pixels in the red-eye candidate region is calculated, and it is checked if SDr(ave) is larger than a threshold Th_FJ1_RDiff (inequality (15)).

$$SDr(ave) > Th\_FJ1\_RDiff \quad (15)$$

Various methods of calculating the average value of the sums of differences between neighboring pixels may be used. For example, the average value of the sums of differences between the interest pixel and eight neighboring pixels may be calculated, or the difference between the interest pixel and left neighboring pixel may be simply calculated. The above determination can be similarly applied to G and B components, luminance values, or evaluation values Er in place of R components.

Determination of Characteristic Amount Group 2 (S12)

In the determination of characteristic amount group 2, a surrounding region is set for each of the red-eye candidate regions which are left without being excluded from the candidate region list by the determination of characteristic amount group 1, and determination processing about luminance components in the surrounding region is executed. The determination of characteristic amount group 2 includes, e.g., the following determination processes.

A surrounding region (e.g., a 5× region shown in FIG. 13C) is set for the interest red-eye candidate region. An average luminance value Y(ave) of eight blocks of the surrounding region except for the block 1301 is calculated, and it is checked if the average luminance value Y(ave) falls within the range from a threshold Th_FJ2_YMin to a threshold Th_FJ2_YMax (both inclusive). When the average luminance value Y(ave) falls outside this range, i.e., if the surrounding region of the block 1301 is extremely bright or dark, the interest red-eye candidate region is excluded from the candidate region list.

The above determination about luminance may be made for the all the eight blocks of the surrounding region, or average luminance values Y(ave) may be calculated for respective blocks of the surrounding region, and may be compared with thresholds set in correspondence with these blocks.

A 2× surrounding region (FIG. 13A) is set for the interest red-eye candidate region, and average luminance values Y(ave) of respective eight blocks of the surrounding region except for the block 1301 are calculated. Furthermore, a maximum value Ymax and minimum value Ymin of the eight average luminance values are obtained. When the 2× surrounding region is set for the red-eye candidate region, since the brightness of the surrounding region is likely to change largely, the following determination is made:

$$(Ymax-Ymin) > Th\_FJ2\_MaxMinDiff2 \quad (16)$$

If inequality (16) is not satisfied, the interest red-eye candidate region is excluded from the candidate region list.

On the other hand, a 5× surrounding region (FIG. 13C) is set for the red-eye candidate region, the average luminance values Y(ave) of the eight blocks of the surrounding region are calculated, and the maximum value Ymax and the minimum value Ymin of the eight average luminance values are obtained, as described above. When the relatively broad 5× surrounding region is set for the red-eye candidate region, most of the surrounding regions are skin color regions, and it is not considered that the luminance values change largely in these regions. Therefore, unlike in the case in which the 2× surrounding region is set, the following determination is made:

$$(Ymax-Ymin) < Th\_FJ2\_MaxMinDiff5 \quad (17)$$

If inequality (17) is not satisfied, the interest red-eye candidate region is excluded from the candidate region list.

Determination of Characteristic Amount Group 3 (S13)

In the determination of characteristic amount group 3, a surrounding region is set for each of the red-eye candidate regions which are left without being excluded from the candidate region list by the determination processes of characteristic amount groups 1 and 2, and determination about saturation and hue in the surrounding region is made. The determination of characteristic amount group 3 includes, e.g., the following determination processes.

A surrounding region (e.g., a 5× region shown in FIG. 13C) is set for the red-eye candidate region, and a ratio Rh of the number of pixels whose hue angles fall within a range ±Th_FJ3_HRange. Since the surrounding region of a red-eye region is a skin color region, the hue angles of most of pixels should fall within the above range. Therefore, if the calculated ratio Rh is equal to or larger than a threshold Th_FJ3_HRatio, that red-eye candidate region is left. However, if the ratio Rh is less than the threshold, that red-eye candidate region is excluded from the candidate region list. Note that the ratio Rh is calculated by:

$$Rh = Nh/\Sigma N \quad (18)$$

where

Nh is the number of pixels whose hue angles fall within Th_FJ3_HRange, and $\Sigma N$ is the number of pixels of the eight blocks.

A surrounding region (e.g., a 5× region shown in FIG. 13C) is set for the red-eye candidate region, and an average saturation value S(ave) of all the eight blocks of the surrounding region is calculated. It is then checked if the average saturation value S(ave) falls within the range from a threshold Th_FJ3_SMin to a threshold Th_FJ3_SMax (both inclusive). If S(ave) falls outside the above range, the interest red-eye candidate region is excluded from the candidate region list.

The determination of saturation may be done for each block. That is, the average saturation value S(ave) may be calculated for each block of the surrounding region, and may be compared with a threshold which is set in advance.

Furthermore, a white color region (white region) is more likely to exist around a red-eye region. Hence, if a pixel which has a small saturation value S and high lightness value L exists in a surrounding region (e.g., a 3× region shown in FIG. 13B) set for the red-eye candidate region, that red-eye candidate region is left. More specifically, if a pixel in which a ratio S/L of the saturation value S and lightness value L is equal to or smaller than a threshold Th_FJ3_WhitePix exists, that red-eye candidate region is left. If the above determination is negative, the interest red-eye candidate region is excluded from the candidate region list.

Determination of Characteristic Amount Group 4 (S14)

In the determination of characteristic amount group 4, a surrounding region is set for each of the red-eye candidate regions which are left without being excluded from the candidate region list by the determination processes of characteristic amount groups 1 to 3, and a determination about an edge in the surrounding region is made. Since a very strong edge is present near a human eye, it can be an effective characteristic amount. An example in which a known Sobel filter is used in edge detection will be described below. However, the present invention is not limited to such a specific filter, and a similar determination processing can be attained even when other edge detection filters are used. Since the Sobel filter is known to those who are skilled in the art, a detailed description thereof will be omitted. The determination of characteristic amount group 4 includes, e.g., the following determination processes.

A surrounding region (e.g., a 2× region shown in FIG. 13A) is set for the red-eye candidate region, and the Sobel filter is applied to pixels within the surrounding region. An average value So(ave) of Sobel output values obtained for respective pixels as a result of filtering is calculated. Since a strong edge often exists near a human eye, the average value So(ave) is compared with a threshold Th_FJ4_SobelPow. If So(ave) Th_FJ4_SobelPow, the interest red-eye candidate region is excluded from the candidate region list.

Also, a surrounding region (e.g., a 3× region shown in FIG. 13B) is set for the red-eye candidate region, and the Sobel filter is applied to pixels within the surrounding region. A difference Ds between the maximum and minimum values of Sobel output values obtained for respective pixels as a result of filtering is calculated. Since a strong edge exists near a human eye, and a flat portion of a skin color also exists, the difference Ds should assume a relatively large value. Therefore, the difference Ds is compared with a threshold Th_FJ4_MaxMinDiff, and if Ds Th_FJ4_MaxMinDiff, the interest red-eye candidate region is excluded from the candidate region list.

Furthermore, a surrounding region (e.g., a 3× region shown in FIG. 13B) is set for the red-eye candidate region, and the Sobel filter is applied to pixels within the surrounding region. Sobel output values obtained for respective pixels as a result of filtering are stored as an edge image in an array Sobel[y][x] assured in the RAM 103. Next, a barycentric position (Xw, Yx) of the edge image is calculated. The barycentric position (Xw, Yx) is given by:

$$(Xw, Yw) = (\Sigma x \cdot Sobel[y][x]/Sobel[y][x], \Sigma y \cdot Sobel[y][x]/Sobel[y][x]) \quad (19)$$

If the interest red-eye candidate region is a human eye image, the barycentric position (Xw, Yx) should be present near the center of the edge image. Therefore, it is checked if the barycentric position (Xw, Yx) is included in the block 1301. If the barycentric position (Xw, Yx) is included in the block 1301, that interest red-eye candidate region is extracted; otherwise, it is excluded from the candidate region list.

Figure 17:
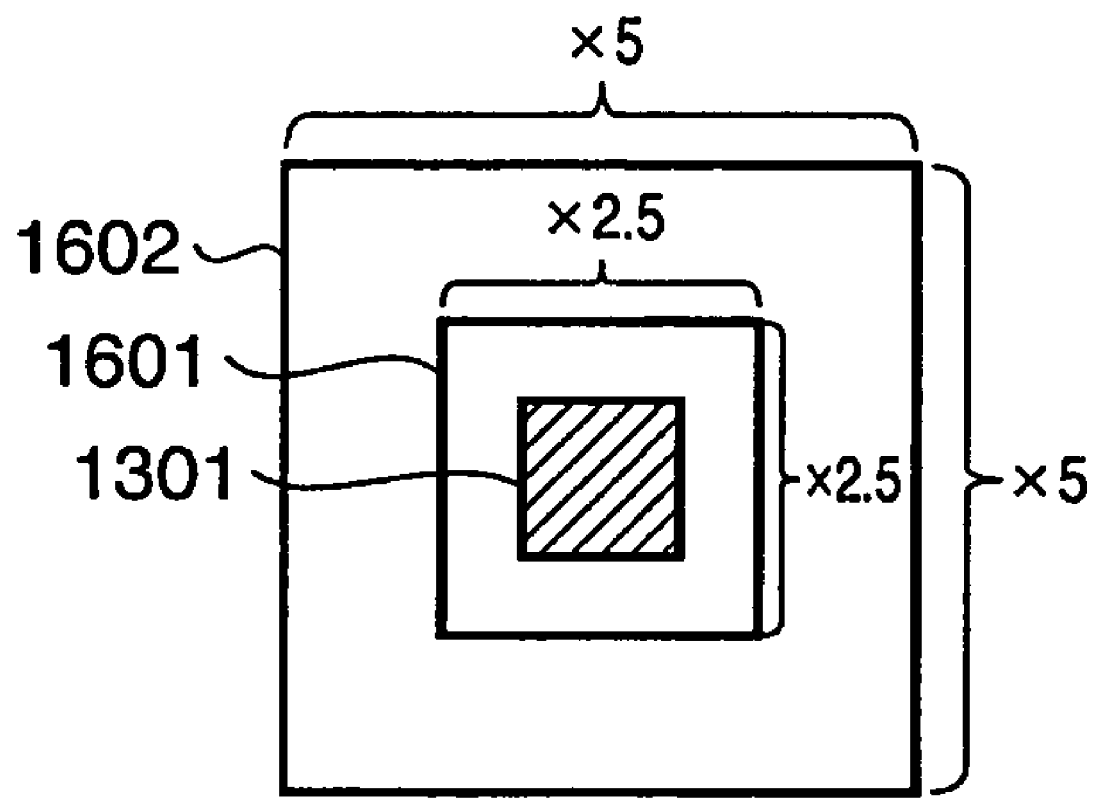
FIG. 17 is a view for explaining a method of setting a surrounding region.

Moreover, a 5× surrounding region (FIG. 13C) is set for the red-eye candidate region, and the Sobel filter is applied to pixels within the surrounding region. Sobel output values obtained for respective pixels as a result of filtering are stored as an edge image in an array Sobel[y][x]. The array Sobel[y][x] becomes an array having the same size as the number of pixels of the 5× surrounding region. Two regions shown in FIG. 17, i.e., a central region 1601 and external region 1602, are defined for the entire surrounding region including the block 1301, and the average values of the Sobel output values stored in the array Sobel[y][x] are calculated for these regions. In FIG. 17, the size of the central region 1601 is set to be 2.5 times that of the block 1301. However, the present invention is not limited to such specific size. Let $SPow^{in}$ and $SPow^{out}$ be the average values of the Sobel output values in the central region 1601 and external region 1602. Since a stronger edge is present in the central region 1601 than in the external region 1602 in the vicinity of a human eye, the following determination is made:

$$SPow^{in}/SPow^{out} > Th\_FJ4\_InOutRatio \quad (20)$$

If inequality (20) is satisfied, the interest red-eye candidate region is determined as a red-eye region. If inequality (20) is not satisfied, the interest red-eye candidate region is not determined as a red-eye region, and is excluded from the candidate region list.

As an application of the above determination, $SPow^{in}$ and $SPow^{out}$ may be independently compared with different thresholds.

The characteristic amount determination unit 204 determines the red-eye candidate region which satisfies all (or some) of the determination conditions of characteristic amount groups 0 to 4 as red-eye regions, and inputs the candidate region list in which the red-eye regions are determined to the correction unit 205.

[Correction Unit]

The correction unit 205 receives the input image data made up of RGB components, and the candidate region list that describes the red-eye regions obtained by the processing executed so far.

Figure 18:
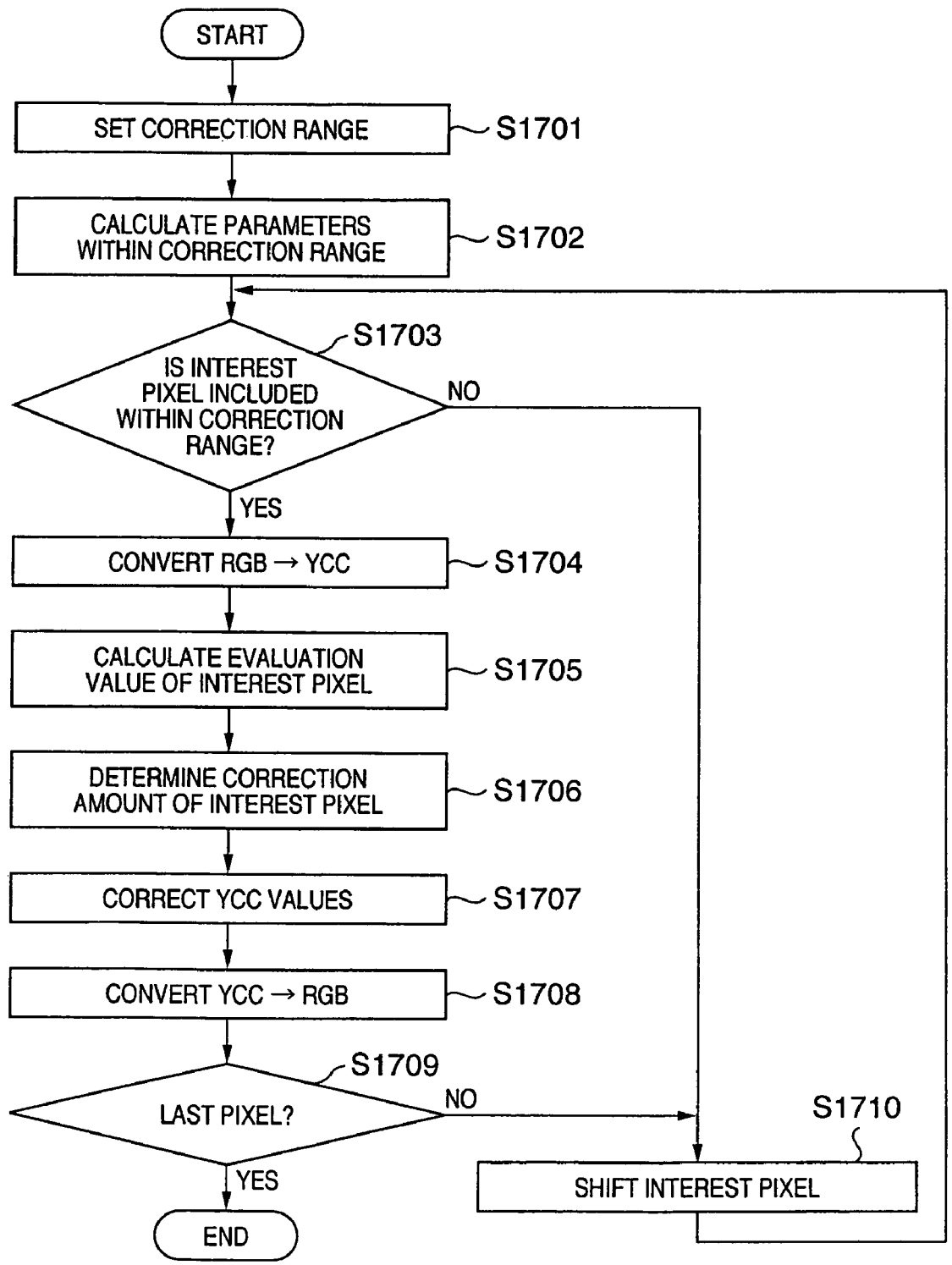
FIG. 18 is a flowchart showing processing for correcting one of a plurality of red-eye regions described in a candidate region list.

FIG. 18 is a flowchart showing processing which is executed by the correction unit 205 to correct one of a plurality of red-eye regions described in the candidate region list. That is, the correction unit 205 corrects the red-eye regions described in the candidate region list one by one by the processing shown in FIG. 18.

Figure 19:
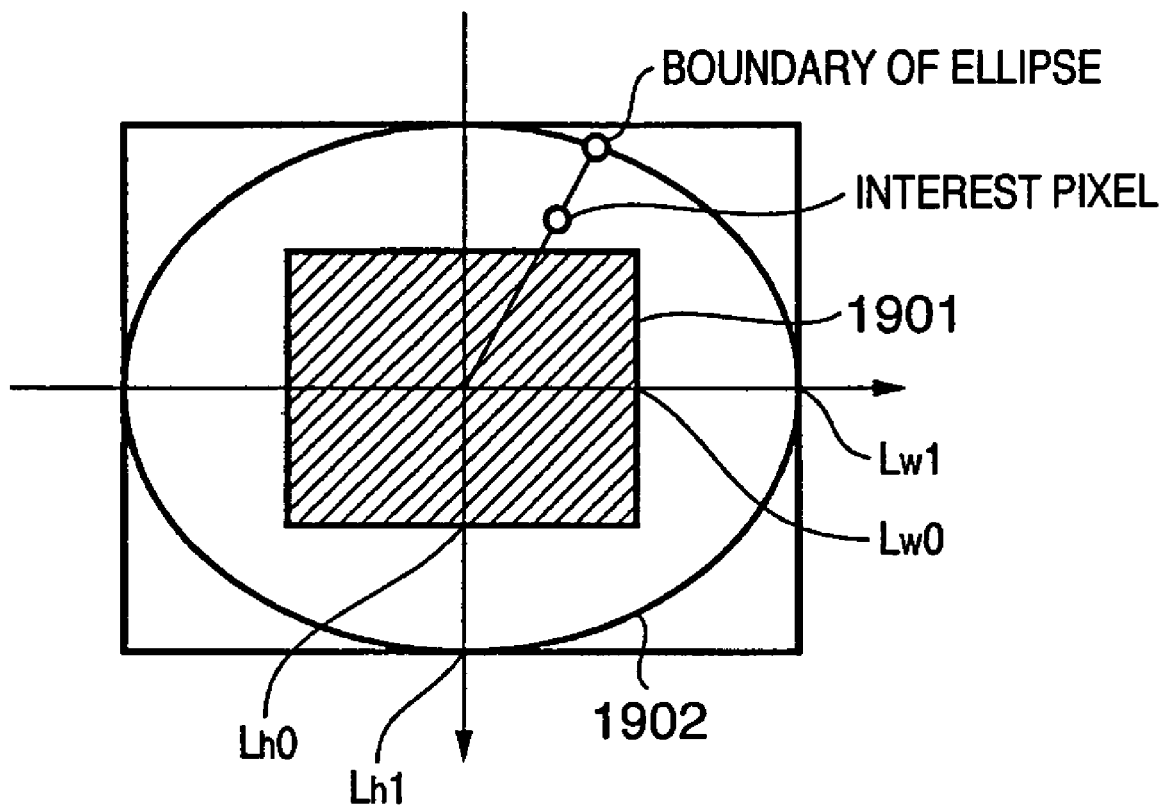
FIG. 19 is a view for explaining decision of a correction range.

A correction range is set for an interest red-eye region (S1701). FIG. 19 is a view for explaining decision of the correction range.

Referring to FIG. 19, a central rectangular region is a red-eye region 1901 described in the candidate region list. An elliptic correction region 1902 which has a major axis Lw1 and minor axis Lh1 that pass through the center of the red-eye region 1901 is set. Note that Lw1 and Lh1 are respectively calculated by:

$$Lw1 = Lw0 \times CPARAM\_AREARATIO$$

$$Lh1 = Lh0 \times CPARAM\_AREARATIO \quad (21)$$

where

Lw0 and Lh0 are ½ the width and height of the red-eye region 1901, and

CPARAM_AREARATIO is a parameter used to determine the correction range.

Next, parameters required for correction in the correction region 1902 are calculated (S1702). The parameters to be calculated are a maximum luminance value Ymax in the elliptic region, and a maximum value Ermax of the evaluation values Er given by equation (3).

It is checked if the interest pixel exists within the correction region 1902 (S1703). Whether or not the interest pixel exists within the elliptic region of the correction region 1902 can be determined by a formula (inequality (22)) for calculating an ellipse:

$$(x/Lw1)^2 + (y/Lh1)^2 \leq 1 \quad (22)$$

where (x, y) are the coordinates of the interest pixel.

Note that the origin of the coordinate system is the center of the interest red-eye region.

If the coordinates (x, y) of the interest pixel satisfy inequality (22), it is determined that the interest pixel exists within the correction region 1902, and the flow advances to step S1704. If the interest pixel does not exist within the correction region 1902, the interest pixel is shifted to the next pixel (S1710), and the flow returns to step S1703.

If the interest pixel exists within the correction region 1902, the RGB component values of the interest pixel are converted into the YCC values of luminance and color difference components (S1704). Various known conversion methods are available, and any of these methods may be used.

An evaluation value for the interest pixel is calculated (S1705). The evaluation value includes parameters required to decide a correction amount in step S1706 to be described later, which are, in particular, the following three values.

(1) A ratio r/r0 of a distance r from the center of the red-eye region 1901 to the interest pixel to a distance r0 from the center to an elliptic boundary.

(2) A ratio Er/Ermax of the evaluation value Er of the interest pixel to the maximum value Ermax of the evaluation values.

(3) A ratio Y/Ymax of a luminance value Y of the interest pixel to a maximum luminance value Ymax.

Using the parameters calculated in step S1705, correction amounts Vy and Vc respectively for the luminance component Y and color difference components Cr and Cb of the interest pixel are calculated (S1706) by:

$$Vy = \{1 - Rr^{Ty1}\} \cdot \{1 - (1-Re)^{Ty2}\} \cdot \{1 - Ry^{Ty3}\}$$

$$Vc = \{1 - Rr^{Tc1}\} \cdot \{1 - (1-Re)^{Tc2}\} \tag{23}$$

where Rr=r/r0, Re=Er/Ermax, and Ry=Y/Ymax.

Both Vy and Vc assume values falling within the range from 0.0 to 1.0, and mean that the correction amounts are larger as they are closer to 1.0. The luminance correction amount Vy is decided using all the three parameters, and becomes smaller as the position of the interest pixel is moved farther away from the center of the correction region 1902. When the evaluation value Er of the interest pixel is smaller than the maximum value Ermax, the correction amount Vy assumes a small value. When the luminance value Y of the interest pixel is close to the maximum value Ymax, the correction amount Vy assumes a small value. Setting a small correction amount Vy of a high-luminance pixel provides an effect of preserving a highlight part (catch light) in the eye. On the other hand, the color difference correction amount Vc is decided by excluding the parameter associated with luminance.

Figure 20:
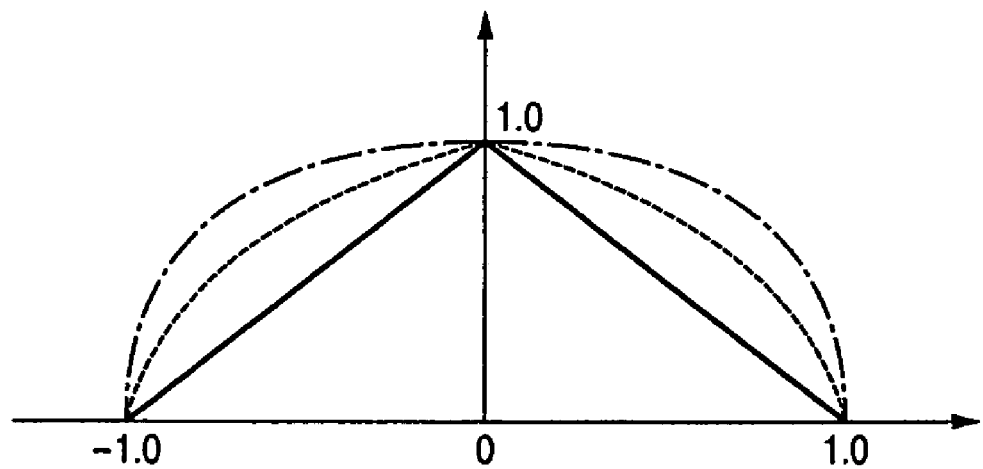
FIG. 20 is a view for explaining a method of setting a correction parameter.

In equations (23), Ty1, Ty2, Ty3, Tc1, and Tc2 are also parameters. Therefore, by setting these parameters, respective evaluation values (i.e., those in braces in equations (23)) can be applied as primary (solid line), secondary (broken line), and ternary (one dashed chain line) straight lines or curves, as shown in FIG. 20.

Next, corrected YCC values are calculated using the correction amounts Vy and Vc (S1707) by:

$$Y' = (1.0 - Wy \cdot Vy) \cdot Y$$

$$C' = (1.0 - Wc \cdot Vc) \cdot C \tag{24}$$

where

Y and C are values before correction,

Y' and C' are values after correction, and

Wy and Wc are weights (0.0 to 1.0).

The weights Wy and Wc are adjusted when a correction strength is to be designated. For example, when three correction strength levels, i.e., weak, medium, and strong, are to be set, results with different correction strengths can be obtained by the same processing by setting both Wy and Wc to 0.3, 0.7, 1.0, or the like.

After new values of the luminance and color difference components are decided, the YCC values are converted into RGB values, and the RGB values are overwritten in the buffer memory for an input image as pixel values after correction, or are stored at predetermined addresses on a buffer memory that stores an output image (S1708).

Until it is determined in step S1709 that the last pixel corresponding to the interest red-eye region is reached, the interest pixel is shifted in step S1710, and the above processes (S1703 to S1708) are repeated. If the last pixel corresponding to the interest red-eye region has been reached, the control enters correction processing of the next red-eye region, thus repeating the correction processing for all red-eye regions recorded in the candidate region list.

Note that in the method described above, an image input to the correction unit 205 is made up of RGB components, and after the input image is converted into luminance and color difference components, which are corrected, the corrected luminance and color difference components are converted again to RGB components. However, the present invention is not limited to such specific method. For example, the RGB components may be converted into lightness and saturation components, and after these lightness and saturation components are corrected using the same method, the corrected lightness and saturation components may be converted into RGB components again, thus obtaining substantially the same result.

Furthermore, in the aforementioned example, the ratio Er/Ermax of the evaluation value Er of the interest pixel to the maximum value Ermax of the evaluation values in the correction region 1902 is used as the parameter used to decide the correction amount. Alternatively, the parameter may be simply replaced by a saturation value. That is, the correction amount may be decided using the ratio of the saturation value of the interest pixel to the maximum saturation value in the correction region 1902.

As described above, whether or not a pixel forms a red-eye region is determined using the evaluation value Er calculated based on the relationship between R and G components in place of saturation. Hence, a red-eye image of a person who has a dark pigment color (or a rich pigment) can be extracted with high precision. By applying the boundary tracing method to a binary image corresponding to the pixels of the red-eye candidate region, a red circular region can be extracted from the binary image at high speed with a very small arithmetic volume. Various characteristic amounts which allows the apparatus to decide whether a particular region is a red-eye region are calculated from the red circular region, and are evaluated, thus finally specifying the red-eye region with high precision. The red-eye candidate regions are narrowed down by executing a determination of characteristic amounts in an appropriate order in consideration of effects of each individual characteristic amount determination and the arithmetic volumes upon calculating the characteristic amounts, and a candidate region whose likelihood of a red-eye region is low is excluded early in the process. Therefore, a red-eye region can be detected with a minimum required processing volume.

Second Embodiment

Image processing according to the second embodiment of the present invention will be described below. Note that the same reference numerals in the second embodiment denote the same parts as in the first embodiment, and a detailed description thereof will be omitted.

Figures 21A, 21B:
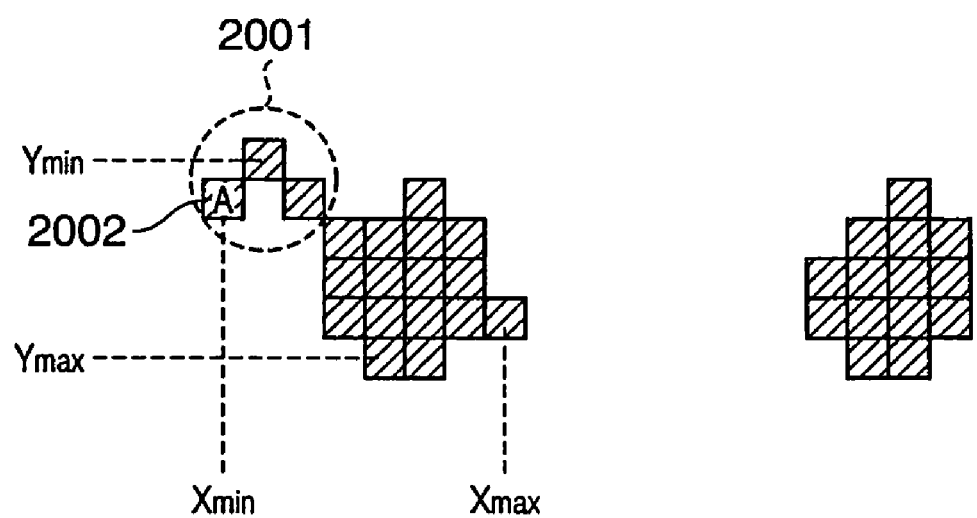
FIGS. 21A and 21B are views for explaining a problem to be solved by the second embodiment.

The adaptive binarization processing described in the first embodiment sets the window 403 (see FIG. 4) having a predetermined size in the left direction (front side of the main scan direction) of the interest pixel. The average value Er(ave) of the evaluation values of pixels in the window 403 is calculated, and whether or not the interest pixel forms a red color region is checked using the average value Er(ave) as a threshold, thus attaining binarization. Such a method refers to a small number of pixels to calculate the threshold, and can speed up the processing. However, since the window 403 is set in only the left direction of the interest pixel, the binarization result depends on the processing direction. As a result, when the adaptive binarization processing is applied to the image shown in FIG. 5A, the edge of an eyelid is sometimes extracted as pixels which form a red color region 2001 in addition to the pupil portion as a red-eye region, as shown in FIG. 21A. The reason for this will be described below.

In the first embodiment, the threshold used to binarize an interest pixel 2002 is the average value Er(ave) of the evaluation values of pixels in the window, which is set in the left direction of the interest pixel 2002, and binarization is attached based on a comparison result between the evaluation value Er of the interest pixel 2002 and the average value Er(ave) (see formulas (6)). Since the window is present in the left direction with respect to the pupil to be extracted, it is normally set on a skin color portion. The pixel value of the skin color portion of a person who has a pale pigment color (or a light pigment) is specified by, e.g., (R, G, B)=(151, 135, 110). When the evaluation value Er of this pixel is calculated using equation (3), it is 11%, i.e., a relatively small value. On the other hand, the value of the pixel 2002 corresponding to the edge of the eyelid is specified by, e.g., (R, G, B)=(77, 50, 29), i.e., the luminance value is slightly lower than the skin color portion. When the evaluation value Er of this pixel is calculated, it is 35%. Upon comparison of these evaluation values, the evaluation value Er of the edge of the eyelid is apparently larger than that of the skin color portion that is present in the window. For this reason, according to the adaptive binarization processing of the first embodiment, the pixel 2002 is readily extracted as a pixel which forms the red color region, although it depends on the setting of the parameter Margin_RGB.

As a result, a red color region bounded by (Xmin, Ymin) and (Xmax, Ymax) is extracted, as shown in FIG. 21A. When this extraction result is input to the red circular region extraction unit 203, a red circular region is extracted using a region broader than an original red color region, resulting in reliability drop for the extraction result, a long extraction time, and the like.

If a window with the same size is also set for the pixel 2002 in the right direction, the window includes pixels corresponding to the edge of the eyelid, and most of the pupil portion of a red-eye image in some cases in addition to skin color pixels. For this reason, the average value Er(ave) of the evaluation values in the window set in the right direction increases. As a result, since the pixel 2002 does not have any outstanding evaluation value Er compared to those in the window set in the right direction, it is hardly determined as a pixel which forms a red color region.

An example in which windows are set in both the right and left directions in the adaptive binarization processing to be executed by the red region extraction unit 202 will be described hereinafter as the second embodiment.

Figure 22A:
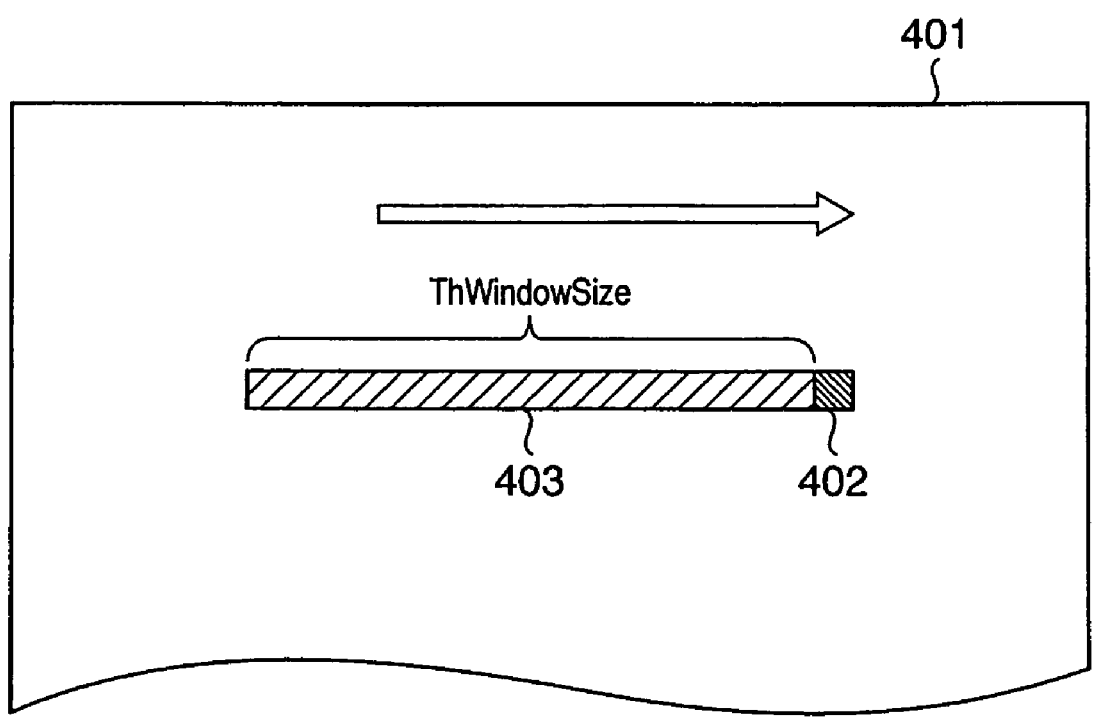
FIGS. 22A and 22B are views for explaining adaptive binarization processing in the second embodiment.

In the adaptive binarization processing of the second embodiment, as shown in FIG. 22A, the window 403 is set for the interest pixel 402 in the left direction, and the interest pixel 402 is binarized by the same method as in the first embodiment. The binarization result is stored in a buffer for a binary image assured on the RAM 103 while shifting the interest pixel 402 from the left to the right, as indicated by an arrow in FIG. 22A.

Figure 22B:
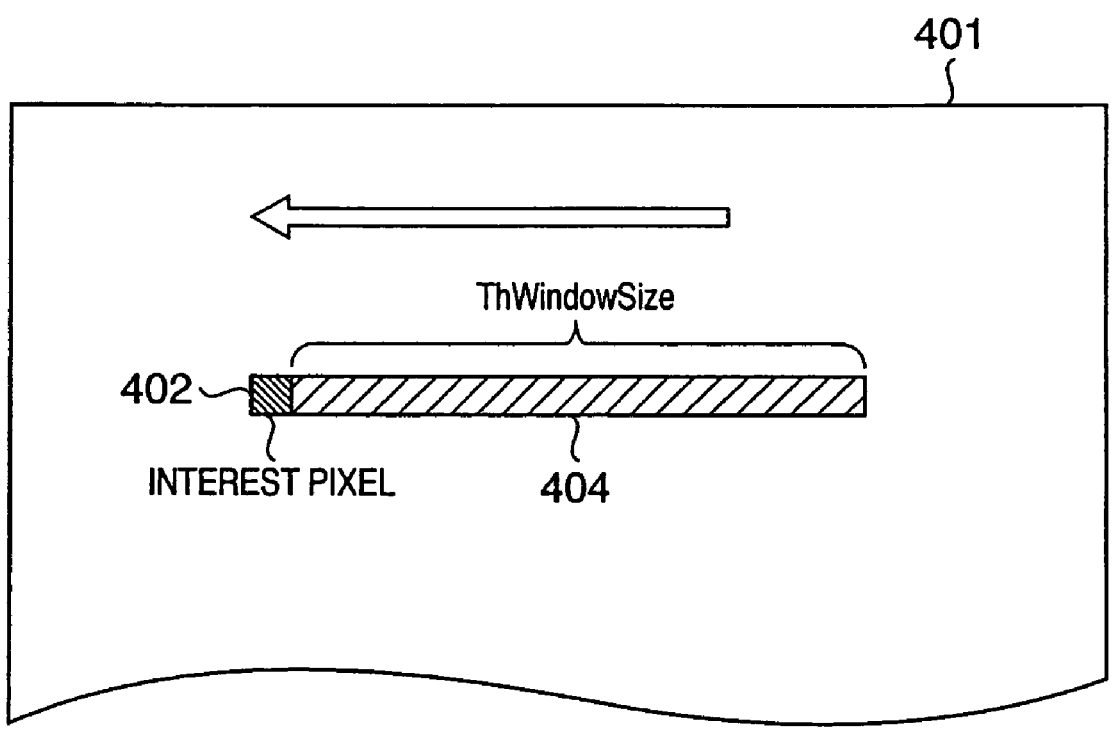
Figure 23:
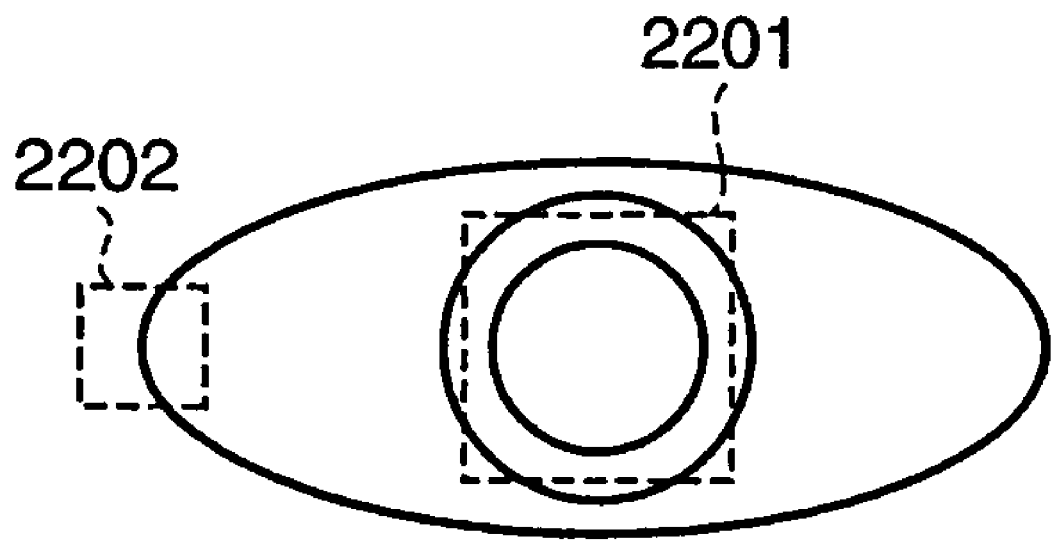
FIG. 23 is a view for explaining a problem to be solved by the third embodiment.

When the interest pixel 402 reaches the right end of the line, and binarization that shifts the interest pixel 402 from the left to right is completed, binarization processing that shifts the interest pixel 402 from the right to left is executed on the same line, as shown in FIG. 22B. In this case, a window 404 used to set a threshold value for binarization is set in the right direction of the interest pixel 402.

In either of the binarization processes in the two directions, a pixel with its binarization result='1' is stored in the buffer for a binary image as a pixel which forms a red color region.

FIG. 21B shows an example of pixels which form a red color region obtained by the bidirectional adaptive binarization processing. Compared to the result (FIG. 21A) of unidirectional adaptive binarization processing, pixels of the edge of the eyelid and the like are removed, and a red color region can be extracted more appropriately.

As described above, when a red color region is extracted by the adaptive binarization processing, since the window used to calculate a binarization threshold is set in both the right and left directions with respect to the interest pixel, pixels which form a red color region can be extracted with high precision.

Third Embodiment

Image processing according to the third embodiment of the present invention will be described hereinafter. Note that the same reference numerals in the third embodiment denote the same parts as in the first and second embodiments, and a detailed description thereof will be omitted.

In the first and second embodiments, the method for extracting pixels which form a red color region by executing the adaptive binarization processing that focuses attention on the evaluation value Er given by equation (3) has been described. Such a method often detects pixels of an inner or outer canthus portion 2202 as pixels which form a red color region in addition to a pupil portion 2201 of a red-eye image. When the inner or outer canthus portion 2202 is enlarged, many "dark red" pixels specified by, e.g., (R, G, B)=(81, 41, 31) exist. The evaluation value of this pixel is 49%, i.e., a relatively large value. For this reason, in the adaptive binarization processing of the first and second embodiments, a pixel set with a given size is more likely to be detected. In addition, since the lightness, hue, saturation, and the like of the edge and surrounding region have values of an eye, all determination conditions may be satisfied in the red circular region extraction unit 203 and characteristic amount determination unit 204, and such region is likely to be finally erroneously determined as a red-eye region. The third embodiment comprises an arrangement which can solve this problem.

Figure 24:
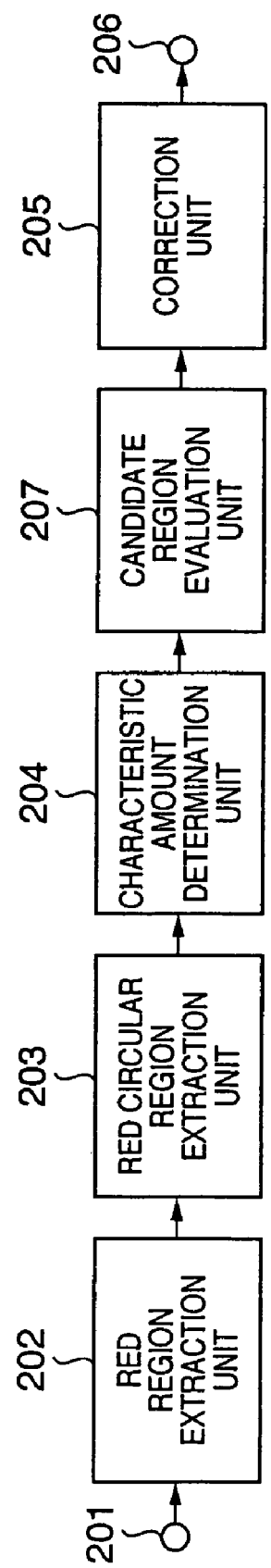
FIG. 24 is a functional block diagram showing an overview of automatic correction processing of a red-eye image according to the third embodiment.

FIG. 24 is a functional block diagram showing an overview of automatic correction processing of a red-eye image according to the third embodiment. This processing is executed by the CPU 101. Compared to the first embodiment, a candidate region evaluation unit 207 is added.

The candidate region evaluation unit 207 sorts out red-eye candidate regions by evaluating the relative position and area of each individual red-eye candidate region with reference to the candidate region list generated by the processing executed so far. More specifically, the candidate region evaluation unit 207 excludes a red-eye candidate region which is determined to be unsuitable as a red-eye region from the candidate region list.

Figure 25:
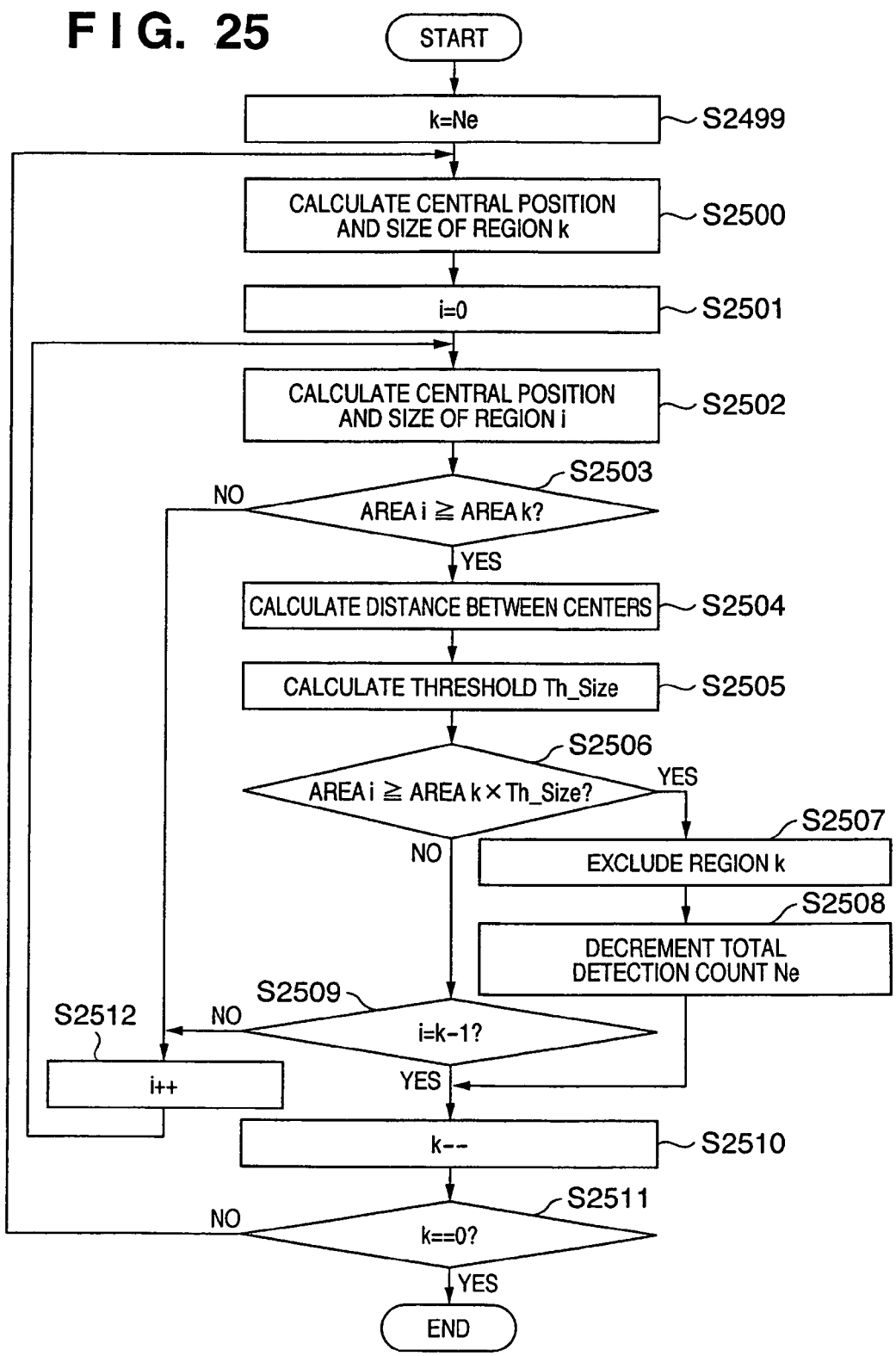
FIG. 25 is a flowchart showing processing of a candidate region evaluation unit.

FIG. 25 is a flowchart showing processing of the candidate region evaluation unit 207. Note that k (0-th to (k−1)-th) regions are extracted as red-eye candidate regions (a total detection count Ne=k) by the processing of the characteristic amount determination unit 204.

The total detection count Ne is set in counter k (S2499), and the central position and size of the k-th red-eye candidate region (to be referred to as "region k" hereinafter) are calculated (S2500). Note that the length of the short side of the red-eye candidate region extracted as a rectangular region is calculated as the size. Zero is set in counter i (S2501), and an area (to be referred to as "area k" hereinafter) of region k is compared with an area (to be referred to as "area i" hereinafter) of another red-eye candidate region (to be referred to as "region i" hereinafter) (S2502, S2503). If area i<area k, counter i is incremented (S2512), and the flow returns to step S2502.

Figure 26:
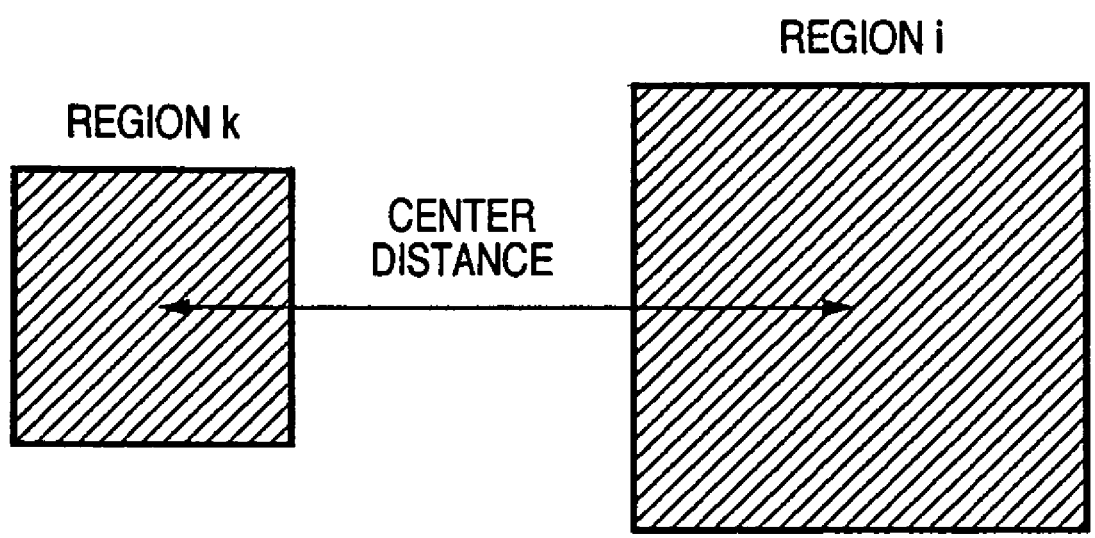
FIG. 26 is a view for explaining a center distance Size.

If area i≧area k (if there is a red-eye candidate region having an area larger than region k), a center distance Size (FIG. 26) between the two regions is calculated (S2504). A threshold Th_Size used to evaluate and determine the size is calculated from the center distance Size (S2505).

Figure 27:
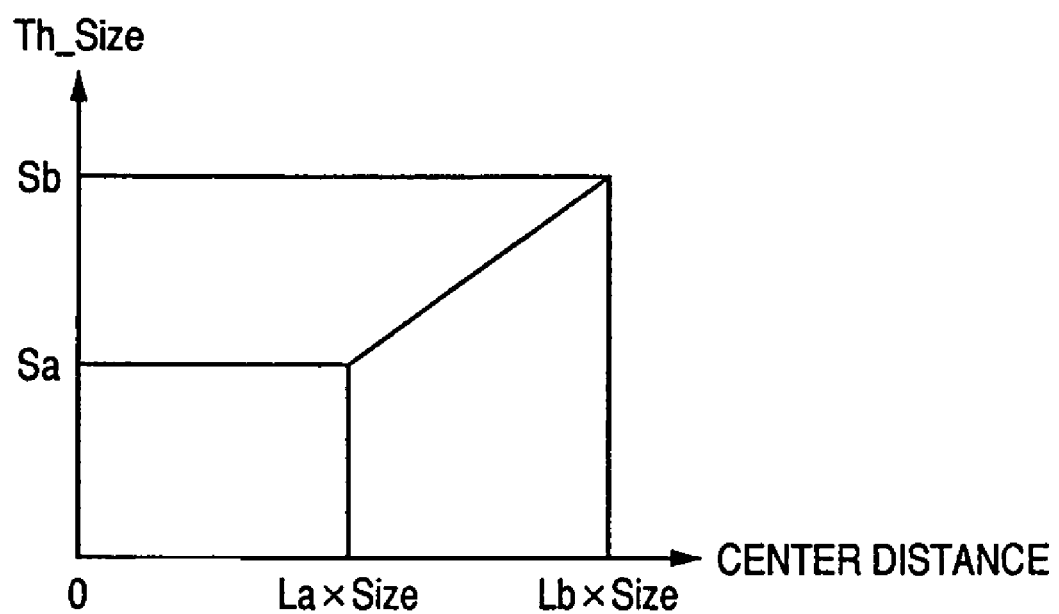
FIG. 27 shows an example of the relationship between the center distance Size and a threshold Th_Size.

FIG. 27 shows an example of the relationship between the center distance Size and threshold Th_Size. The abscissa plots the center distance, and the ordinate plots the threshold Th_Size. Also, Sa, Sb, La, and Lb are parameters, and for example, values such as La=3.0, Lb=5.0, Sa=1.0, and Sb=2.0 are set. When these parameters are set, if the center distance Size assumes a value three times or less the size (the length of the short side) of region k, the threshold Th_Size is set to 1.0. If the center distance Size assumes a value three times to five times the size of region k, the threshold Th_Size is decided as a value on the straight line shown in FIG. 27. When the center distance Size assumes a value that exceeds five times the size, the determination processing is skipped.

Next, area i is compared with area k×Th_Size (S2506). If area i≧area k×Th_Size, i.e., if a red-eye candidate region larger than region k exists near region k, it is determined that region k is not a red-eye region, and region k is excluded from the candidate region list (S2507). The total detection count Ne is decremented (S2508), and the flow proceeds to step S2510.

On the other hand, if area i<area k×Th_Size, and if it is determined in step S2509 that i<k−1, counter i is incremented (S2512), and the flow returns to step S2502. On the other hand, if i=k−1, counter k is decremented (S2510). If it is determined in step S2511 that k>0, the flow returns to step S2500; if k=0, the processing ends.

With this determination processing, an unnecessary candidate region can be excluded from the red-eye candidate regions recorded in the candidate region list.

As described above, when a red-eye candidate region smaller than a given red-eye candidate region is present near that given red-eye candidate region, the smaller red-eye candidate region is excluded from the candidate region list, thus solving the aforementioned problem.

Fourth Embodiment

Image processing according to the fourth embodiment of the present invention will be described hereinafter. Note that the same reference numerals in the fourth embodiment denote the same parts as in the first to third embodiments, and a detailed description thereof will be omitted.

Figure 28A:
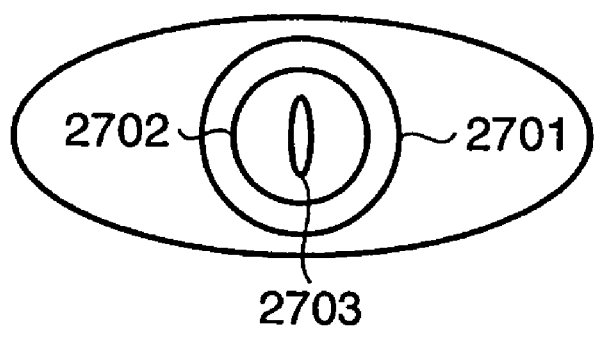
FIGS. 28A and 28B are views for explaining a problem to be solved by the fourth embodiment.

When the adaptive binarization processing of the first embodiment is used, a red-eye region is often divided by a highlight region which exists in the red-eye image. FIG. 28A is an enlarged view of a red-eye image. Reference numeral 2701 denotes an iris region; reference numeral 2702 denotes red pupil region; and reference numeral 2703 denotes a highlight (white) region generated by a photographic flash. As is well known, since the red-eye effect is induced by photographic flash light, the pupil region 2702 of the sensed image data includes a highlight region where the photographic flash light was reflected with a high probability. Such highlight region is also called catch light.

Figure 28B:
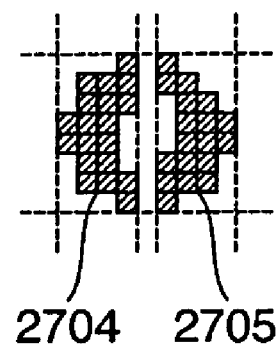

Normally, the highlight region does not influence the red-eye detection processing since it exists as a small dot. However, depending on the photographing conditions, the highlight region can become large enough to occupy most of the pupil region, or it can become an elongated region like the highlight region 2703 shown in FIG. 28A. When the adaptive binarization processing of the first embodiment is applied to such image data, the highlight region 2703 assumes very small evaluation values Er. For this reason, the highlight region is not recognized as a red color region, and the pupil region is often divided into two regions 2704 and 2705 in the binary image, as shown in FIG. 28B. When the subsequent processing is applied to such two regions, the probability that the pupil region 2702 is determined as a red-eye region decreases considerably. The fourth embodiment solves this problem by performing processing for combining red circular regions at neighboring positions.

Figure 29:
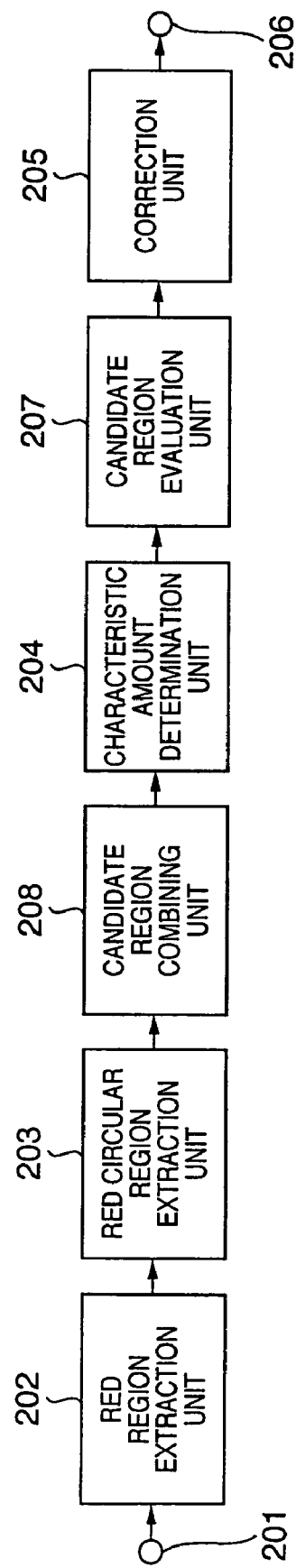
FIG. 29 is a functional block diagram showing an overview of automatic correction processing of a red-eye image according to the fourth embodiment.

FIG. 29 is a functional block diagram showing an overview of automatic correction processing of a red-eye image according to the fourth embodiment. This processing is executed by the CPU 101. Compared to the third embodiment, a candidate region combining unit 208 is added.

The candidate region combining unit 208 determines with reference to the candidate region list, which stores the upper left and lower right coordinates of red circular regions extracted by the red circular region extraction unit 203, whether or not a red circular region which exists in the vicinity of an interest red circular region is to be combined. FIG. 31 shows an example of the candidate region list. FIG. 31 shows an example in which four red circular regions are recorded. However, in practice, the number of red circular regions becomes several tens to several thousands in some cases.

Figure 30:
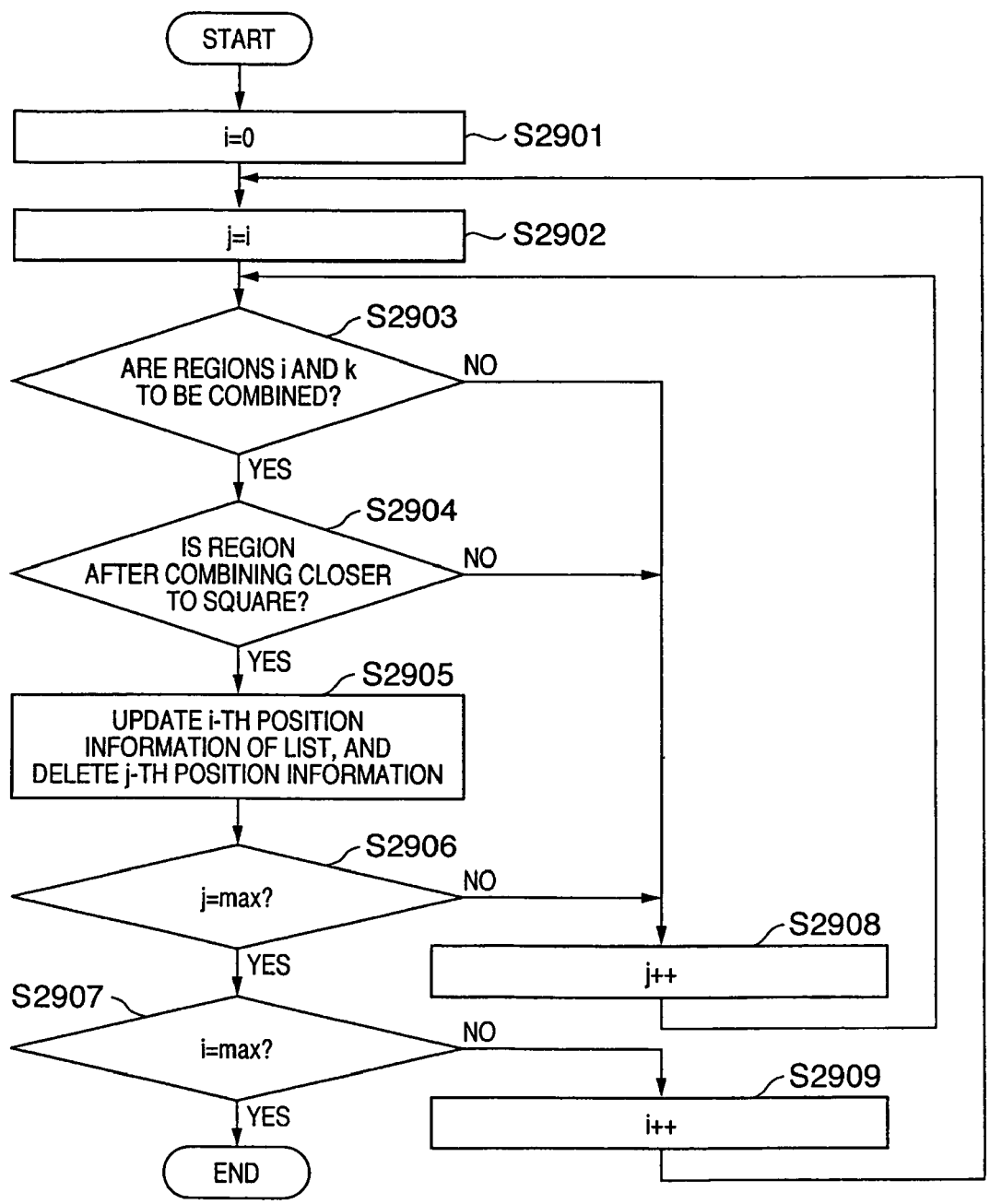
FIG. 30 is a flowchart showing processing of a candidate region combining unit.

FIG. 30 is a flowchart showing processing of the candidate region combining unit 208.

Counters i and j are respectively reset to i=0 and j=i (S2901, S2902), and it is determined if i-th and j-th red circular regions (to be referred to as "region i" and "region k" hereinafter) recorded in the candidate region list are to be combined (S2903). More specifically, a rectangular region which includes region having width Wi and height Hi (unit: the number of pixels) and region j having width Wj and height Hj is set, and its width Wij and height Hij are calculated. Next, whether or not regions i and j exist at neighboring positions, and have nearly the same sizes is determined using:

$$(Wi \cdot Hi + Wj \cdot Hj)/(Wij \cdot Hij) > Th\_J \tag{25}$$

where Th_J is a threshold (0<Th_J≦1.0).

Figure 32B:
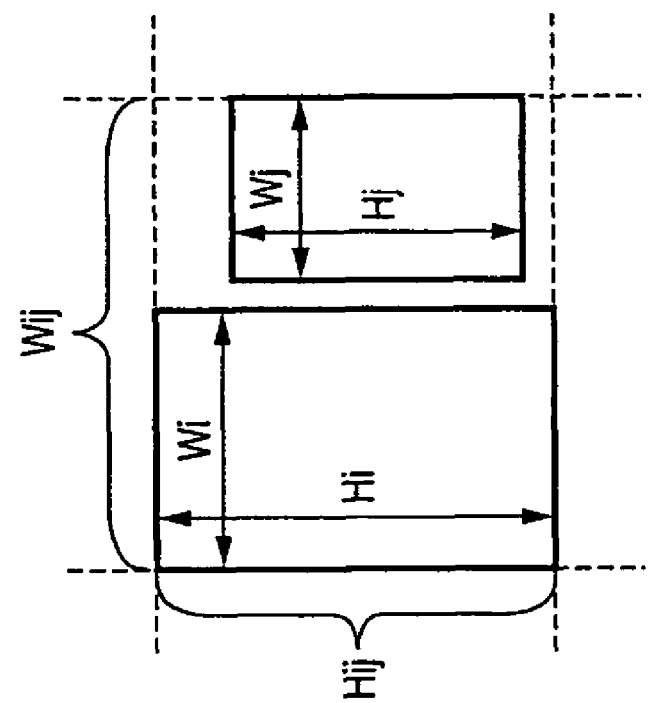
FIGS. 32A and 32B are views for explaining candidate region combining processing.
Figure 32A:
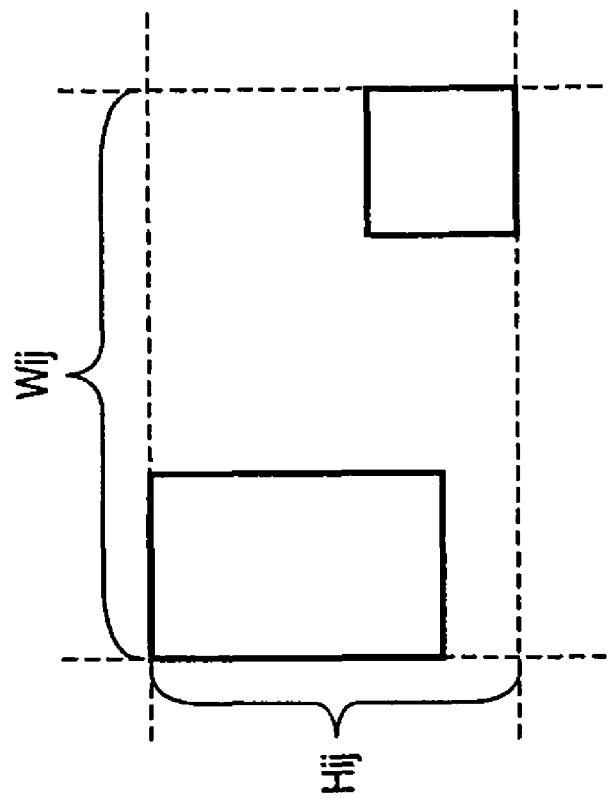

Inequality (25) has the following meaning. That is, the ratio of the sum of the areas of areas i and j to that of the rectangular region which includes both the regions is calculated, and if the ratio is larger than the threshold Th_J, it is determined that the two regions exist at neighboring positions, and have roughly the same sizes. If regions i and j have a positional relationship shown in FIG. 32B, the ratio calculated in inequality (25)

assumes a small value, and it is determined that the two regions are not to be combined.

If it is determined in step S2903 that the two regions are not to be combined, counter j is incremented (S2908), and the flow returns to step S2903. If it is determined that the two regions are to be combined, it is determined whether or not a region after combining has a shape close to a square compared to the region before combining (S2904). More specifically, determination is made using:

$$\min(Wij,Hij)/\max(Wij,Hij) > \max\{\min(Wi,Hi)/\max(Wi,Hi), \min(Wj,Hj)/\max(Wj,Hj)\} \quad (26)$$

Inequality (26) has the following meaning. That is, when the aspect ratio (1.0 or less) of the rectangular region including regions i and j is compared with a larger one of the aspect ratios of regions i and j, the left side is larger, i.e., the region after combining has a shape close to a square. If inequality (26) is satisfied, the rectangular region after combining has a shape closer to a square, and as a result, a red circular region also has a shape close to a circular.

If inequality (26) is not satisfied, counter j is incremented (S2908), and the flow returns to step S2903. If inequality (26) is satisfied, the i-th coordinate information in the candidate region list is updated to that of the rectangular region including regions i and j, and the j-th position information is deleted from the candidate region list (S2905).

If it is determined in step S2906 that the value of counter j has not reached a maximum value (the end of the list), counter j is incremented (S2908), and the flow returns to step S2903. If the value of counter j has reached the maximum value, and if it is determined in step S2907 that the value of counter i has not reached a maximum value (the end of the list), counter i is incremented (S2909), and the flow returns to step S2902. If the value of counter i has reached the maximum value, the processing ends.

With this determination processing, red circular regions which are recorded in the candidate region list and are divided by the highlight region can be combined.

As described above, when a red circular region which is similar to an interest red circular region exists near that interest red circular region, it is checked whether or not a region obtained by combining these regions becomes close to the condition (the circumscribed rectangle is close to a square) of a red-eye region. In this manner, red circular regions corresponding to a red-eye region divided by the highlight region which exist in the pupil can be appropriately combined.

Fifth Embodiment

Image processing according to the fifth embodiment of the present invention will be described hereinafter. Note that the same reference numerals in the fifth embodiment denote the same parts as in the first to fourth embodiments, and a detailed description thereof will be omitted.

The fifth embodiment will explain a method of carrying out the image processing described in the first to fourth embodiments in an environment in which the processing performance of a CPU and the storage capacity of an available memory (RAM or the like) are limited. Such environment assumes an image processor implemented in image input/output devices, such as a copying machine, a printer, a digital camera, a scanner, an MFP, and the like.

In such an environment, the available work memory size is as small as several hundred KB to several MB at a maximum. On the other hand, the resolutions of digital cameras are increasing, and cameras having image sensing capability beyond 10 million pixels are available. In order to execute processing for detecting a red-eye region from such high-resolution image using the limited work memory, it is effective to decrease the resolution of an input image. For example, it is possible to reduce an input image of eight million pixels to a ¼ resolution, i.e., an image of two million pixels by subsampling that image at one-pixel intervals in the horizontal and vertical directions. In this case, the capacity of the work memory required to store an image is reduced to ¼. However, even when the image size is reduced to two million pixels, a work memory of about 6 MB (in case of 24-bit RGB data) is required to simultaneously hold the entire reduced image. Such storage capacity does not pose any problem in a personal computer or workstation comprising a large-capacity RAM. However, under the limited memory resources of the above environment, further means are required to reduce the required work memory size.

The fifth embodiment will explain a method of reducing an input image, dividing the reduced image into bands, and sequentially extracting red-eye regions for respective bands. In band division, an overlap area is formed, as shown in FIG. 33, so as to allow detection of a red-eye image located at the band boundary. Referring to FIG. 33, reference numeral 3201 denotes a reduced image obtained by reducing an input image; and BandHeight, the number of lines which form one band. That is, extraction processing of a red-eye region is applied to an image of Width×BandHeight (unit: the number of pixels). The band divided in the fifth embodiment overlaps a previous band by the number of lines indicated by OverlapArea. In this manner, a red-eye region 3202 which is located at the band boundary can also be extracted.

Figure 34:
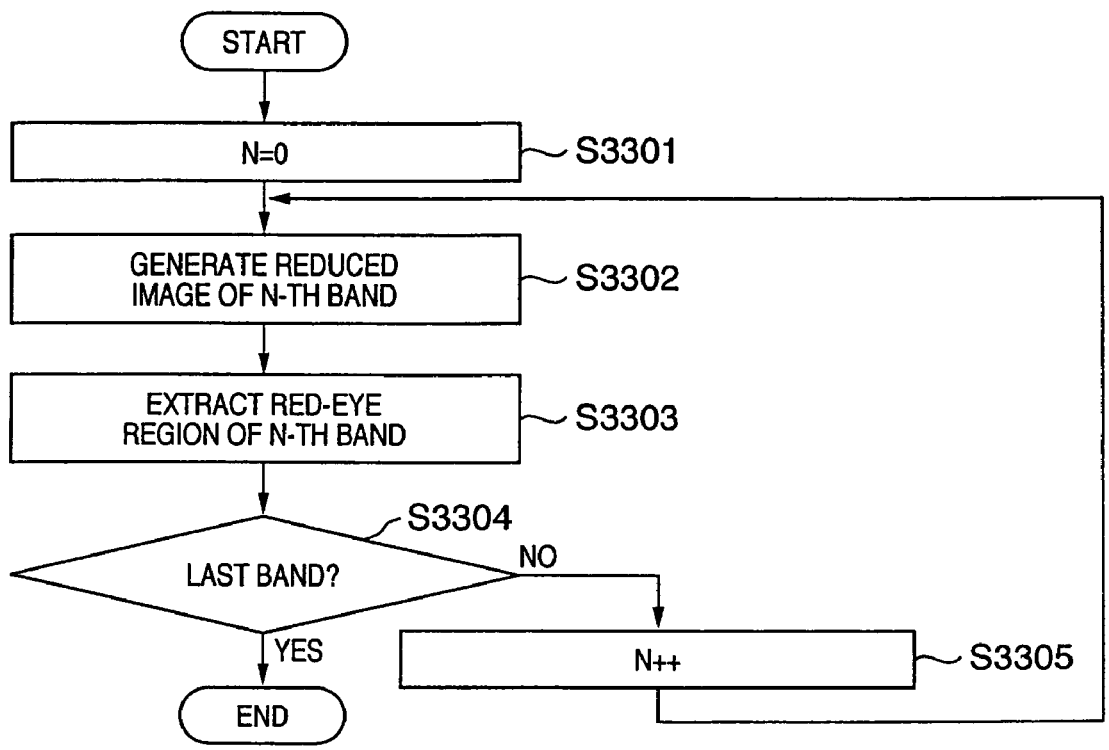
FIG. 34 is a flowchart showing extraction processing of a red-eye region in the fifth embodiment.

FIG. 34 is a flowchart showing extraction processing of a red-eye region according to the fifth embodiment. This processing is executed by a CPU mounted on an image input/output device.

Counter N is reset to zero (S3301), and a reduced image of the N-th band is generated (S3302).

As a generation method of a reduced image, a method of generating a reduced image by simple decimation will be explained for the sake of simplicity. Assume that an image of eight million pixels is stored in a memory (e.g., a flash memory or a hard disk equipped in the device or an externally mounted memory card) of the image input/output device.

In step S3302, the image data in the memory is accessed. If the image data is saved in the JPEG format, a first MCU (Minimum Coding Unit) block is decoded, and is stored in a predetermined area of a work memory. This MCU block has a size of, e.g., 16×8 pixels. The decoded image data is subsampled at, e.g., one-pixel intervals to generate image data of 8×4 pixels, which is stored in an image storage area for red-eye region extraction on the work memory. This processing is repeated until the image storage area for red-eye region extraction for BandHeight lines is full of data. With this processing, a band image used to reduce the image of eight million pixels to two million pixels can be obtained.

Of course, as the image reduction method, various other methods such as a nearest neighbor method, a method using linear reduction, and the like are available, and any of these methods may be used.

After the band image of the reduced image is obtained by the above processing, extraction processing of a red-eye region of the N-th band is executed (S3303).

Figure 35:
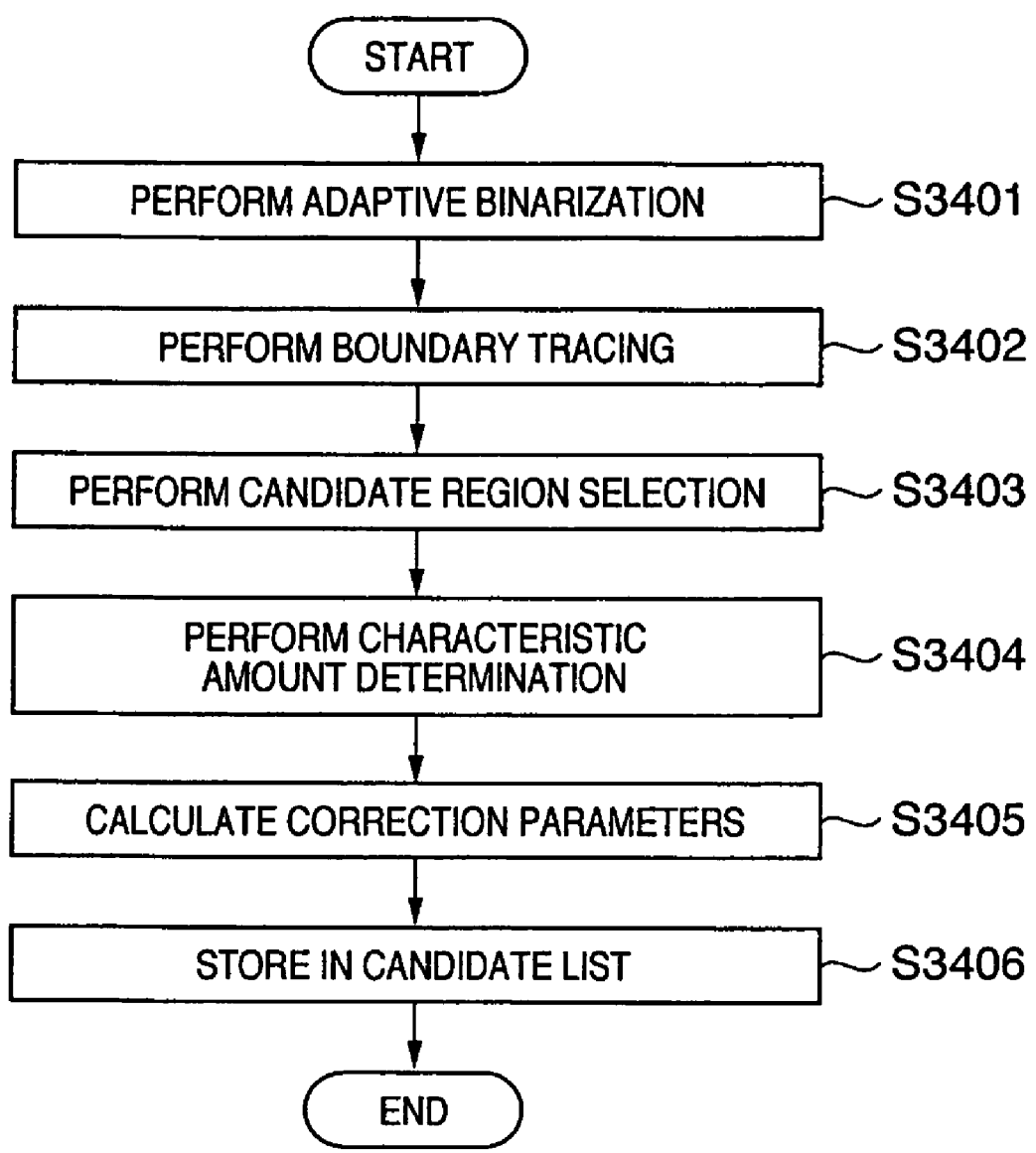
FIG. 35 is a flowchart showing details of the extraction processing of a red-eye region of the N-th band.

FIG. 35 is a flowchart showing details of the extraction processing of the red-eye region of the N-th band (S3303).

The reduced image data undergoes the adaptive binarization processing described in the above embodiment (S3401). The processing result (binary image of the red color region) is saved in an area assigned independently of the storage area of the reduced image. In this case, the processing of the OverlapArea of the reduced image has already been done in the (N−1)-th band. Therefore, if N>0, the processing of the OverlapArea is skipped, and the processing result of the (N−1)-th band may be reused. In this way, the processing can be speeded up.

Next, boundary tracing described in the above embodiment is applied to the binarization result (red color region) to extract red circular regions from the band image (S3402).

Prior to the characteristic amount determination processing for the extracted red circular regions, candidate region selection processing is executed to select a red circular region which is to undergo the characteristic amount determination processing from a plurality of red circular regions (S3403).

Figure 36:
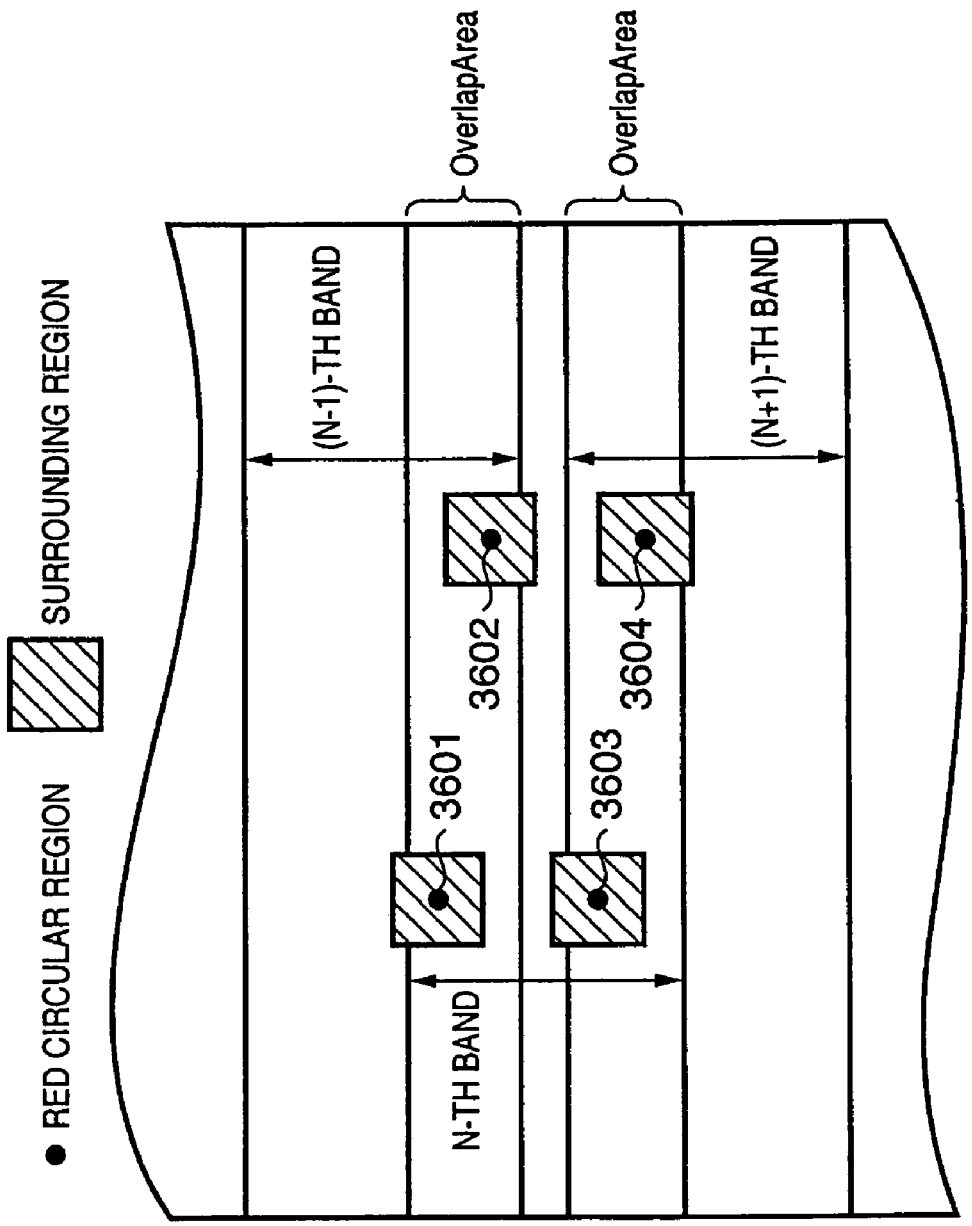
FIG. 36 shows an example of four red circular regions which are present in OverlapAreas of the (N−1)-th, N-th, and (N+1)-th bands.

FIG. 36 shows an example in which four red circular regions exist in OverlapAreas of the (N−1)-th, N-th, and (N+1)-th bands. For example, paying attention to a red circular region 3603, this region exists on both the N-th and (N+1)-th bands. If characteristic amount determination is done for both the bands, the red circular area which exists in the Overlap Area is always processed twice, resulting in poor efficiency.

Hence, in which of the N-th and (N+1)-th bands the red circular region 3603 is to undergo characteristic amount determination will be examined. The upper portion of a surrounding region set for the red-circular region 3603 is omitted in the (N+1)-th band, while the surrounding region can be referred to in the N-th band. Therefore, the determination result of the N-th band has a higher reliability for the red circular region 3603. To state it in a more general term, the characteristic amount determination of a red circular region which exists in the Overlap Area should be processed in a band in which a broader surrounding region can be referred to.

Figure 37:
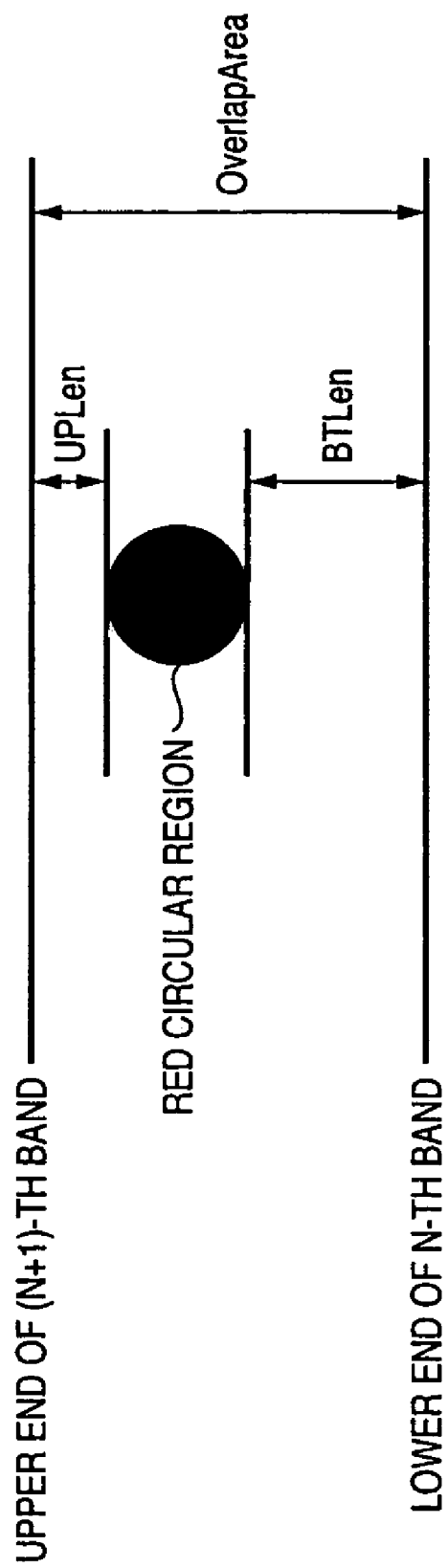
FIG. 37 is a view for explaining candidate region selection processing.

Therefore, in the candidate region selection processing (S3403) of the fifth embodiment, a distance UPLen from the upper end of an interest red circular region to the upper end of the (N+1)-th band is predicted for each of red circular regions which exist in the OverlapArea, as shown in FIG. 37. Since the (N+1)-th band is not processed, the position of the interest red circular region in the (N+1)-th band is predicted. Then, a distance BTLen from the lower end of each red circular region to the lower end of the N-th band is calculated. If UPLen<BTLen, it is determined that the characteristic amount determination of the interest red circular region is done in the N-th band; if UPLen BTLen, it is determined that the characteristic amount determination is not done in the N-th band (in other words, it is done in the (N+1)-th band). Note that if the characteristic amount determination is not done in the N-th band, the interest red circular region is excluded from the candidate region list of that band.

Likewise, when the distances UPLen and BTLen of a red circular region 3604 shown in FIG. 36 are calculated, since UPLen>BTLen holds, the red circular region 3604 undergoes the characteristic amount determination in the (N+1)-th band. When the above relationship is applied to red circular regions 3601 and 3602, these regions undergo the characteristic amount determination in the (N−1)-th and N-th bands, respectively.

In this way, in the candidate region selection processing (S3403), the distances (margins) between the upper and lower ends of each red circular region which exists in the OverlapArea and the band ends are calculated, and which of bands the characteristic amount determination is to be done is determined according to their relationship. Hence, a red circular area in the OverlapArea can be prevented from repetitively undergoing characteristic amount determination.

Referring back to FIG. 35, the characteristic amount determination processing described in the above embodiment is applied to the red circular region (S3404) selected in the candidate region selection processing (S3403). As a result, parameters required for correction processing of the region which is determined to be a red-eye region are calculated (S3405), and a combination of information of the red-eye region and parameters is added to the candidate region list (S3406), as shown in FIG. 38. Note that the parameters include the maximum luminance value Ymax of the correction region required to calculate the correction amounts Vy and Vc (equations (23)) and the maximum value Ermax of the evaluation values.

Referring back to FIG. 34, upon completion of the extraction processing of the red-eye region of the N-th band (S3303) shown in FIG. 35, it is checked if the processing of the last band is complete (S3304). If the processing is complete, the flow ends; otherwise, counter N is incremented (S3305), and the flow returns to step S3302.

Figure 39:
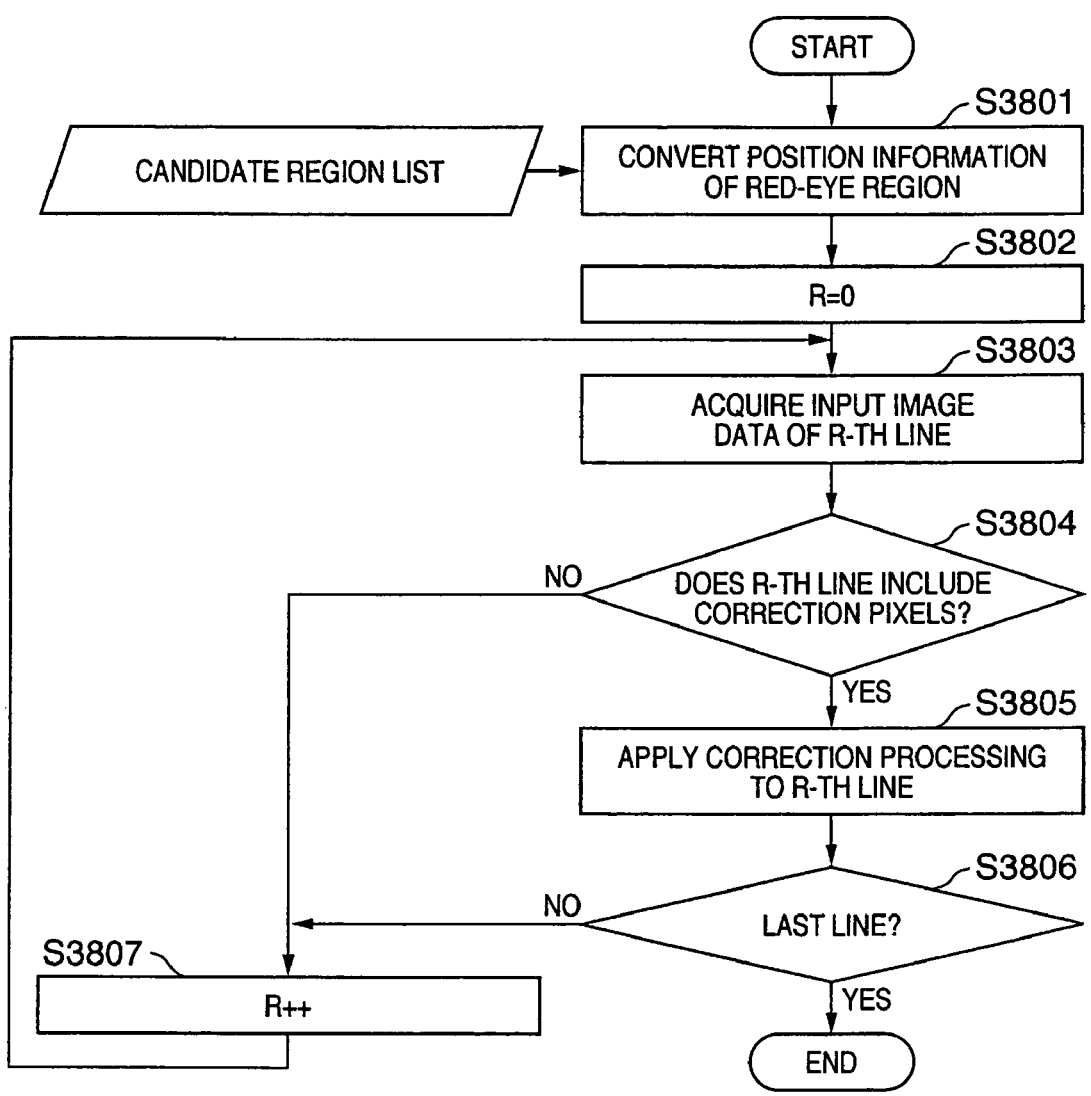
FIG. 39 is a flowchart showing correction processing in the fifth embodiment.

FIG. 39 is a flowchart showing the correction processing in the fifth embodiment.

The position information of each red-eye region is converted (S3801). In the fifth embodiment, assuming that the extraction processing and correction processing of each red-eye region are executed as embedded processing of the image input/output device, the extraction processing of the red-eye region is done based on the reduced image, as described above. However, an image to be corrected is a high-resolution image before reduction, and may be an image which is obtained by enlarging the image before reduction to a print (output) resolution or rotating it in case of an image output device such as a printer or the like. Therefore, the position information of each red-eye region extracted from the reduced image must be converted in accordance with the reduction ratio or enlargement ratio (zoom ratio) and rotation.

Figure 41:
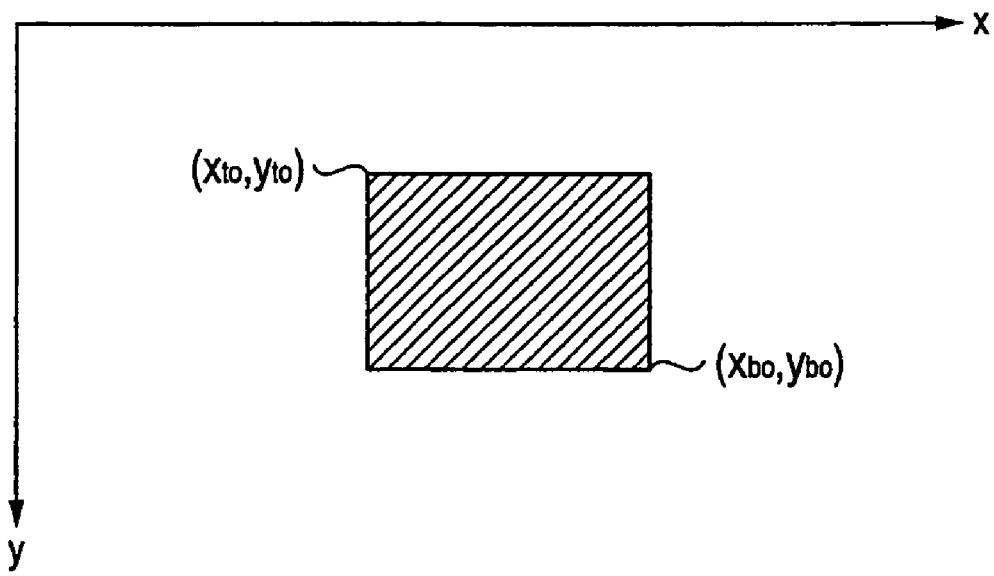
FIG. 41 is a view for explaining position information of a red-eye region stored in the candidate region list.

Assume that the position information stored in the candidate region list is expressed by upper left coordinates $(x_{t0}, y_{t0})$ and lower right coordinates $(x_{b0}, y_{b0})$ of a red-eye region, as shown in FIG. 41, the numbers of pixels of the width and height of the reduced image are W0 and H0, and those of the width and height of the image to be corrected are W1 and H1. In this case, the coordinates of the red-eye region on the image to be corrected are calculated by:

$$(x_{t1}, y_{t1}) = \{\text{int}(x_{t0} \cdot k), \text{int}(y_{t0} \cdot k)\}$$

$$(x_{b1}, y_{b1}) = \{\text{int}(x_{b0} \cdot k), \text{int}(y_{b0} \cdot k)\} \quad (27)$$

where k=W1/W0, int( ) is a maximum integer which does not exceed itself, $(x_{t1}, y_{t1})$ are the upper left coordinates of the red-eye region on the image to be corrected, and $(x_{b1}, y_{b1})$ are the lower right coordinates of the red-eye region on the image to be corrected.

After the coordinates of the red-eye region on the image to be corrected are decided in step S3801, an elliptic region is set around the red-eye region, and the following processing is done for pixels included in the elliptic region as pixels to be corrected as in the first embodiment.

Counter R is reset to zero (S3802) to acquire image data of the R-th line of the image to be corrected (S3803). In the fifth embodiment, processing for correcting the image to be corrected for respective lines will be explained. However, the present invention is not limited to this, and correction may be made for respective bands each including the predetermined number of lines. The image data of the image to be corrected can be acquired by expanding image data stored in the storage device 105 shown in FIG. 1, a memory card, or the like in the compression format such as JPEG or the like for a predetermined number of lines, and acquiring data for one line (or a plurality of lines) from the expanded data.

It is checked if the R-th line includes pixels to be corrected (S3804). The correction processing of the fifth embodiment uses the elliptic region set around each red-eye region (rectangular region) as the region to be corrected. For this reason, whether or not the R-th line is located between the upper and lower ends of the region to be corrected is determined for all red-eye regions stored in the candidate region list. If the R-th line does not include any pixels to be corrected, counter R is incremented (S3807), and the flow returns to step S3803.

Figure 40:
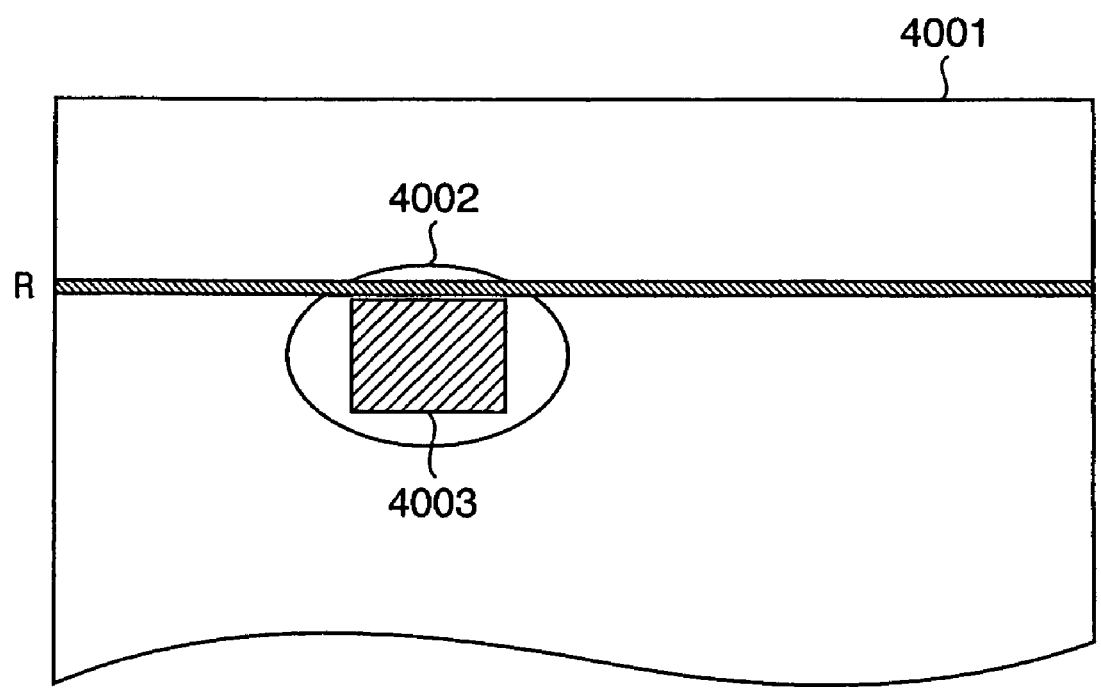
FIG. 40 shows the relationship between a correction line and a region to be corrected.

For example, in case of FIG. 40, the R-th line is included in a region 4002 to be corrected set around a given red-eye region 4003. Therefore, the correction processing described in the first embodiment is applied to pixels included in the region 4002 to be corrected of the R-th line (S3805). As the maximum luminance value Ymax and the maximum value Ermax of the evaluation values required in this correction processing, those which are calculated and stored in the candidate region list in step S3405 above are used.

By repeating the aforementioned processing until it is determined in step S3806 that the R-th line reaches the last line, the correction processing can be applied to the entire input image.

The image data which has undergone the correction processing is stored in, e.g., the storage device 105, or undergoes color conversion and pseudo halftone processing and is then printed on a print sheet by, e.g., the printer 110.

In this way, since an input image is reduced and is divided into bands, and extraction processing of red-eye regions is executed for respective bands, extraction and correction of red-eye regions described in the first to fourth embodiments can be done under an environment in which the memory resources are very small. Since bands are divided to have overlap areas between neighboring bands, a red-eye region which exists at a band boundary can be extracted.

Note that an extraction unit of red-eye regions may be mounted in an image input device such as an image sensing device or the like, and a correction unit of red-eye regions may be mounted in an image output device such as a printer or the like.

Modification of Embodiments

In each of the above embodiments, the evaluation value Er which does not use B of RGB component values is defined as that for each pixel. However, the present invention is not limited to this. For example, an evaluation value Er may be defined by:

$$Er=(i \cdot R+j \cdot G+k \cdot B)/R \qquad (28)$$

where the coefficients i, j, and k are weights which can assume negative values, and the coefficient k may be set to be zero or a value smaller than the coefficients and j, thus obtaining the same effect as in the above embodiment.

After a pixel value is converted into another color space such as Lab, YCbCr, or the like, the evaluation value Er may be defined regardless of a blue component or by setting a small weight for a blue component.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, and then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and an ROM can be used for providing the program codes.

Furthermore, besides the aforesaid functions according to the above embodiments, these functions can be realized by executing the program codes which are read by a computer, and the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card, which is inserted into the computer or in a memory provided in a function expansion unit, which is connected to the computer, the CPU or the like contained in the function expansion card or unit performs a part or the entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-174253, filed Jun. 14, 2005, which is hereby incorporated by reference herein in its entirety.

What is claimed is:

1. An image processing apparatus comprising:
    a divider, arranged to divide an input image into band images each including a predetermined number of lines so that an overlap area exists between neighboring band images;
    an extractor, arranged to extract candidate pixels which form an image region exhibiting poor color tone for each band image; and
    a decider, arranged to decide the band image which is to undergo a characteristic amount determination for the extracted candidate pixels, based on the position of a candidate region including the candidate pixels in the overlap area.

2. The apparatus according to claim 1, wherein said decider decides the band image which is to undergo the characteristic amount determination, based on the distance between an upper portion of the candidate region which exists in the overlap area and a lower end of the band image, and the distance between a lower portion of the candidate area and a lower end of the band image.

3. An image processing apparatus for detecting an image region exhibiting poor color tone of an eye image, comprising:
- a divider, arranged to sequentially divide an input image into band images each including a predetermined number of lines so that an overlap area exists between neighboring band images;
- a calculator, arranged to calculate evaluation values of the poor color tone based on predetermined color components for each band image and for respective pixels of that band image;
- a pixel extractor, arranged to extract candidate pixels, which form the image region exhibiting the poor color tone, based on the calculated evaluation values for each band image;
- a region extractor, arranged to extract a candidate region having a predetermined shape which is formed by the candidate pixels for each band image; and
- a decider, arranged to decide based on characteristic amounts associated with the eye image calculated from the extracted candidate region for each band image whether or not the extracted candidate region is set as a correction region.

4. The apparatus according to claim 3, wherein said calculator calculates the evaluation value from a red component and green component of the input image, or calculates the evaluation value from the red component, the green component, and a blue component of the input image by applying a weight smaller than the red component and green component to the blue component.

5. The apparatus according to claim 3, wherein said pixel extractor extracts the candidate pixels by setting a predetermined window region near an interest pixel, wherein said calculator calculates evaluation values of pixels included in the window region and an evaluation value of the interest pixel, wherein said pixel extractor also decides a threshold based on the evaluation values of pixels included in the window region, and binarizes the evaluation value of the interest pixel using the threshold.

6. The apparatus according to claim 5, wherein said pixel extractor sets the predetermined window region for a plurality of pixels on a line of the interest pixel.

7. The apparatus according to claim 5, wherein said pixel extractor extracts pixels which can be the candidate pixels by scanning the interest pixel in a line direction in a first scan, extracting pixels which can be the candidate pixels by scanning the interest pixel in a reverse direction on the line in a second scan, and setting pixels commonly extracted in the first and second scans as the candidate pixels.

8. The apparatus according to claim 3, wherein said calculator and said pixel extractor skip processing of the overlap area of second and subsequent band images, and uses an extraction result of the candidate pixels of the overlap area of the immediately preceding band image.

9. The apparatus according to claim 3, wherein said region extractor extracts a region, which is formed by the candidate pixels and has a shape that is approximately a circle or ellipse, as the candidate region.

10. The apparatus according to claim 3, further comprising a determiner arranged to determine the candidate region which exists in the overlap area between a band image whose processing is underway and the next band image to be processed.

11. The apparatus according to claim 10, wherein said determiner calculates a margin between the candidate region that exists in the overlap area and a lower end of the band image whose processing is underway, estimates a margin between the candidate region and an upper end of the next band image to be processed, and makes the determination based on a magnitude relationship between the two margins.

12. The apparatus according to claim 3, wherein said decider calculates a plurality of characteristic amounts associated with the eye image from the candidate region, and decides that the candidate region is to be set as the correction region when the candidate region satisfies all the characteristic amounts or satisfies a predetermined criterion set in advance for a predetermined characteristic amount of the characteristic amounts.

13. The apparatus according to claim 3, further comprising a region excluding section arranged to exclude a small candidate region when a large candidate region, larger than the small candidate region, exists near the candidate region.

14. The apparatus according to claim 3, wherein said region extractor extracts a plurality of candidate regions, and wherein said apparatus further comprises a combiner arranged to combine candidate regions when the candidate regions satisfy a predetermined criterion indicating that the regions are in neighboring positions.

15. The apparatus according to claim 14, wherein said combiner combines two candidate regions when the shape of a region which includes a combination of the two candidate regions is closer to a square than any of the two candidate regions.

16. The apparatus according to claim 3, further comprising a corrector arranged to apply processing for correcting the poor color tone to an image region corresponding to the correction region.

17. An image processing method comprising:
using a processor to perform the steps of:
- dividing an input image into band images each including a predetermined number of lines so that an overlap area exists between neighboring band images;
- extracting candidate pixels which form an image region exhibiting poor color tone for each band image; and
- deciding the band image which is to undergo a characteristic amount determination for the extracted candidate pixels, based on the position of a candidate region including the candidate pixels in the overlap area.

18. An image processing method for detecting an image region exhibiting poor color tone of an eye image, comprising:
using a processor to perform the steps of:
- sequentially dividing an input image into band images each including a predetermined number of lines so that an overlap area exists between neighboring band images;
- calculating evaluation values of the poor color tone based on predetermined color components for each band image and for respective pixels of that band image;
- extracting candidate pixels, which form the image region exhibiting the poor color tone, based on the calculated evaluation values for each band image;
- extracting a candidate region having a predetermined shape which is formed by the extracted candidate pixels for each band image; and
- deciding based on characteristic amounts associated with the eye image calculated from the extracted candidate region for each band image whether or not the candidate region is set as a correction region.

19. A computer program embodied on a non-transitory computer-readable medium for an image processing method, the method comprising the steps of:

dividing an input image into band images each including a predetermined number of lines so that an overlap area exists between neighboring band images;

extracting candidate pixels which form an image region exhibiting poor color tone for each band image; and deciding the band image which is to undergo a characteristic amount determination for the extracted candidate pixels, based on the position of a candidate region including the candidate pixels in the overlap area.

20. A computer program embodied on a non-transitory computer-readable medium for an image processing method for detecting an image region exhibiting poor color tone of an eye image, the method comprising the steps of:

sequentially dividing an input image into band images each including a predetermined number of lines so that an overlap area exists between neighboring band images;

calculating evaluation values of the poor color tone based on predetermined color components for each band image and for respective pixels of that band image;

extracting candidate pixels, which form the image region exhibiting the poor color tone, based on the calculated evaluation values for each band image;

extracting a candidate region having a predetermined shape which is formed by the extracted candidate pixels for each band image; and deciding based on characteristic amounts associated with the eye image calculated from the extracted candidate region for each band image whether or not the candidate region is set as a correction region.

21. A non-transitory computer-readable storage medium comp g storing a computer-executable program for causing a computer to perform an image processing method, the method comprising the steps of:

dividing an input image into band images each including a predetermined number of lines so that an overlap area exists between neighboring band images;

extracting candidate pixels which form an image region exhibiting poor color tone for each band image; and deciding the band image which is to undergo a characteristic amount determination for the extracted candidate pixels, based on the position of a candidate region including the candidate pixels in the overlap area.

22. A non-transitory computer-readable storage medium storing a computer-executable program for causing a computer to perform an image processing method for detecting an image region exhibiting poor color tone of an eye image, the method comprising the steps of:

sequentially dividing an input image into band images each including a predetermined number of lines so that an overlap area exists between neighboring band images;

calculating evaluation values of the poor color tone based on predetermined color components for each band image and for respective pixels of that band image;

extracting candidate pixels, which form the image region exhibiting the poor color tone, based on the calculated evaluation values for each band image;

extracting a candidate region having a predetermined shape which is formed by the extracted candidate pixels for each band image; and deciding based on characteristic amounts associated with the eye image calculated from the extracted candidate region for each band image whether or not the candidate region is set as a correction region.

\* \* \* \* \*